Figure 1:
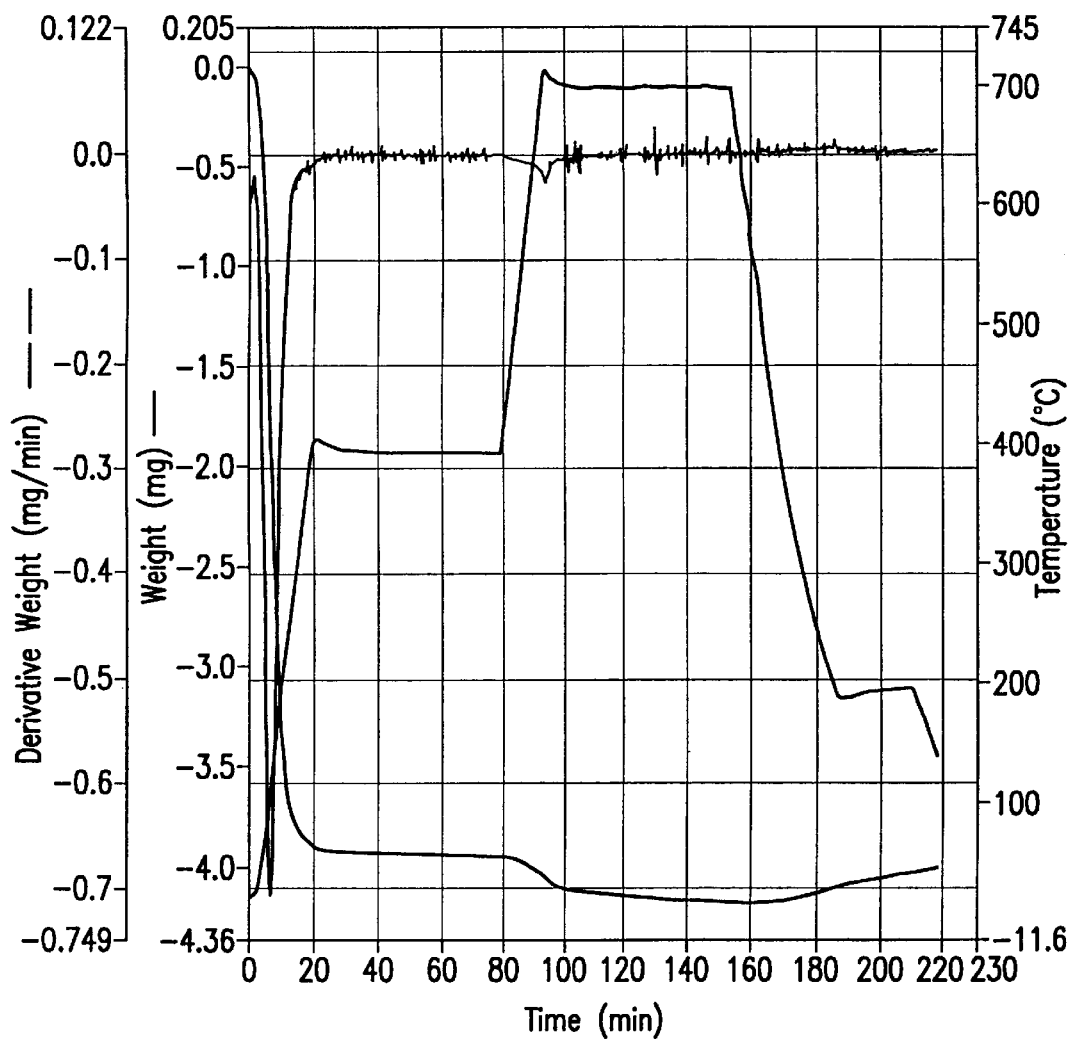

United States Patent [19]
Fraenkel et al.

[11] Patent Number: 6,110,258
[45] Date of Patent: Aug. 29, 2000

[54] METHODS FOR REMOVAL OF WATER FROM GASES USING SUPERHEATED ZEOLITES

[75] Inventors: Dan Fraenkel; Hans H. Funke; Gerald Cooper, all of Boulder, Colo.

[73] Assignee: Matheson Tri-Gas, Inc., Parsippany, N.J.

[21] Appl. No.: 09/166,987

[22] Filed: Oct. 6, 1998

[51] Int. Cl.[7] .......................... B01D 53/04; B01D 53/28
[52] U.S. Cl. .............................. 95/117; 95/126; 95/902; 502/78; 502/79
[58] Field of Search .............................. 95/117, 121, 126, 95/902; 502/78, 79, 85

[56] References Cited

U.S. PATENT DOCUMENTS

| | | | |
|---|---|---|---|
| 4,019,879 | 4/1977 | Rabo et al. | 95/902 X |
| 4,377,502 | 3/1983 | Klotz | 502/78 X |
| 4,544,378 | 10/1985 | Coe et al. | 95/902 X |
| 4,564,509 | 1/1986 | Shealy et al. | 423/210.5 |
| 4,663,052 | 5/1987 | Sherman et al. | 210/679 |
| 4,844,719 | 7/1989 | Toyomoto et al. | 55/16 |
| 4,861,571 | 8/1989 | Harada et al. | 502/78 X |
| 4,925,646 | 5/1990 | Tom et al. | 423/488 |
| 5,070,052 | 12/1991 | Brownscombe et al. | 502/78 X |
| 5,417,742 | 5/1995 | Tamhankar et al. | 95/902 X |
| 5,417,950 | 5/1995 | Sheu et al. | 95/902 X |
| 5,470,557 | 11/1995 | Garney | 95/117 X |
| 5,536,301 | 7/1996 | Lansbarkis et al. | 95/117 |
| 5,616,170 | 4/1997 | Ojo et al. | 95/902 X |
| 5,670,125 | 9/1997 | Sheu et al. | 95/902 X |
| 5,910,292 | 6/1999 | Alvarez, Jr. et al. | 95/117 X |
| 5,958,356 | 9/1999 | Dong et al. | 95/117 X |

FOREIGN PATENT DOCUMENTS

| | | |
|---|---|---|
| 52-65194 | 5/1977 | Japan . |
| 52-89602 | 7/1977 | Japan . |
| 61-54235 | 3/1986 | Japan . |

OTHER PUBLICATIONS

Barrer, R.M. et al., 1970, "The Sorption of Ammonium Chloride Vapor in Zeolites: Part I Hydrogen Chloride and Ammonia", J. Chem. Soc. (A) pp. 765–782.

Collins, J.J., 1963, "A Report on Acid–Resistant Molecular Sieve Types AW–300 and AW–500", Molecular Sieves Product Data Sheet, Union Carbide International Co., 270 Park Avenue, New York, NY 10017.

Davis, M.E., 1991, "Zeolites and Molecular Sieves: Not Just Ordinary Catalysts", Ind. Eng. Chem. Res. 30(8): 1675–1683.

Hales, G.E., 1971, "Drying Reactive Fluids with Molecular Sieves", Chemical Eng. Progress 67(11):49–53.

Hardwick et al., 1989, "Corrosion of Type 316 Stainless Steel in Anhydrous Hydrogen Chloride", Abstract No. 50, pp. 78–79, Presented at the Spring 1989 Meeting of the Electrochemical Society, Los Angeles, CA, May 1989.

Kühl G.H., 1977, "The Acidity of Mordenite", *Molecular Sieves–II*, James R. Katzer, Ed., ACS Symposium Series 40, Chapter 9, pp. 96–107.

Pivonka, 1991, "The Infrared Spectroscopic Determination of Moisture in HCL for the Characterization of HCL Gas Drying Resin Performance", Applied Spectroscopy 45(4):597–603.

Torres et al., 1998, "High Pressure POV Purification of Corrosive Gases: Effect on Gas Distribution Components", from SEMICON West 98 Programs and Events, Jul. 9–21, San Francisco and San Jose, California.

Weber, D.K., 1990, "Preventing Corrosion in Hydrogen Chloride Gas Handling Systems", Microcontamination 8(7):35–37.

Zeolon Acid Resistant Molecular Sieves, 1970, Norton Chemical Process Products Division, pp. 1–11.

*Primary Examiner*—Robert Spitzer
*Attorney, Agent, or Firm*—Pennie & Edmonds LLP

[57] ABSTRACT

A method for removing trace moisture from a gas is disclosed. The method involves heating a zeolite having a high silica-to-alumina ratio to about 400° C. to remove physically absorbed water from the zeolite, followed by heating the zeolite to a temperature in excess of 650° C., to form a superheated zeolite. Heating to temperatures of 650° C. or above is believed to cause dehydroxylation of the zeolite. A method for the preparation of a dehydroxylated zeolite is also disclosed. The superheated zeolite is contacted with the gas, thereby adsorbing water from the gas. A dehydroxylated zeolite for removing trace moisture from a gas wherein the zeolite has a high silica-to-alumina ratio and a low level of metallic impurities is also disclosed. The zeolite and methods of the invention are particularly useful for removing trace water from acid gases such as hydrogen chloride and hydrogen bromide.

54 Claims, 18 Drawing Sheets

METHODS FOR REMOVAL OF WATER FROM GASES USING SUPERHEATED ZEOLITES

1. FIELD OF THE INVENTION

The present invention relates to methods for removing water from gases, in particular acid gases, using a zeolite purifier with a high silica-to-alumina ratio, which has been heated to at least about 650° C. The invention also relates to methods for preparing dehydroxylated zeolites.

2. BACKGROUND OF THE INVENTION

A wide range of hydridic, halide and bulk gases are used in processes for manufacture of semiconductor devices and materials. As semiconductor geometries have become smaller and devices more sophisticated, the purity of these gases has become more crucial to the viability and success of semiconductor manufacture.

Water contamination in acid gases used in the production of semiconductors is particularly disadvantageous for a number of reasons. Even trace amounts of water in acid gases such as hydrogen chloride (HCl) and hydrogen bromide (HBr) cause corrosion of the piping, valves and flowmeters used to handle the gases in semiconductor manufacture. The presence of water in these gases can also cause the walls of the cylinders used to store the gases to corrode. Such corrosion leads to the generation of metal particulate contaminants which can become incorporated into the semiconductor device during manufacture. In addition, certain processes used in semiconductor manufacture result in the decomposition of water present in the process gas into $H_2$ and $O_2$. The presence of these gases can result in formation of additional contaminants, particularly oxides, which can also become incorporated into the semiconductor device. Contamination of semiconductor devices with metal particulate and oxide impurities is severely detrimental to the performance of the devices, and often renders the devices deficient or even useless for their intended purpose. Moreover, the corrosion caused by the presence of water in these gases necessitates frequent replacement of expensive piping, manifolds, valves and other gas handling equipment.

A number of materials have been developed for the removal of moisture from acid gases. One such material is a chlorosilylated alumina which is effective for removal of trace moisture from hydrogen chloride, hydrogen bromide, chlorosilanes and chlorine. This material comprises an octahedral alumina substrate with Al—O—Al linkages, which is functionalized with chlorosilyl groups. The material removes water from the gas by an irreversible chemical reaction of the surface chlorosilyl groups with water, and is capable of removing moisture to levels below 0.1 ppm.

There are a number of disadvantages associated with the use of chlorosilylated alumina for removal of trace moisture from acid gases. The preparation of this material is complex and expensive, involving treatment with silicon tetrachloride ($SiCl_4$), which is a corrosive material. Moreover, chlorosilylated alumina is only suitable for applications using low pressure HCl, i.e., about 50 psig or less. At high pressure, the HCl reacts with the alumina, producing aluminum trichloride ($AlCl_3$ or the dimer, $Al_2Cl_6$) which contaminates the purified gas stream. In the case of HBr, contamination with the aluminum halide occurs even at low pressure since HBr is more reactive than HCl and $AlBr_3$ ($Al_2Br_6$) is more volatile than $AlCl_3$ by about an order of magnitude. The leaching of aluminum from chlorosilylated alumina purifiers in this manner causes the structure of the chlorosilylated alumina to degrade, resulting in particulate contamination of the gas, and necessitating frequent replacement of this solid purifier. Moreover, the material requires a preconditioning step with the halide acid gas during which water is initially generated, with a concomitant temperature increase to 120–150° C. This preconditioning step is time consuming and requires the use of a significant quantity of costly halide acid gas. Furthermore, in many applications, the preconditioning must be conducted off-line, so that critical downstream components are not damaged by the initial surge of moisture from the purifier.

Alumino-silicate zeolites, in particular, molecular sieves of the Zeolite A family such as the 3A, 4A and 5A zeolites, are well known moisture adsorbents. However, the Zeolite-A molecular sieves have proved to be unsuitable for drying acid gases such as HCl and HBr. See, e.g., Barrer, R. M. and Kanellopoulos, A. G., 1970, "The Sorption of Ammonium Chloride Vapor in Zeolites. Part I. Hydrogen Chloride and Ammonia," J. of the Chem. Soc. (A):765 (decomposition of 4A molecular sieves was observed upon exposure to hydrogen chloride at a pressure of 228 mm Hg for 18 hours at 50° C.). The stability of the alumino-silicate zeolites to hydrogen chloride has been found to relate to the silica-to-alumina ratio. The higher the silica-to-alumina ratio, the more stable the zeolite is to hydrogen chloride, with zeolites having silica-to-alumina ratios of 10 and above being considered sufficiently stable to HCl. In contrast, the Type A and Type X (synthetic faujasite) zeolites have silica-to-alumina ratios of 2 and 2.5, respectively, which do not provide them with sufficient stability towards hydrogen chloride.

One type of zeolite with a high silica-to-alumina ratio which is used to remove trace water from acid gases is known as the type AW-300 molecular sieve, which is commercially available from UOP. AW-300 is a natural mordenite-type zeolite, which has the structure $M_2O \cdot Al_2O_3 \cdot 10SiO_2 \cdot 6H_2O$, M being an alkali metal such as Na; a silica-to-alumina ratio of 10, and a pore size of 4 angstroms. This type of mordenite has been reported as useful for removing water from gas mixtures containing hydrogen chloride, such as reformer recycle hydrogen, flue gas, chloroform, trichloroethylene, vinyl chloride, and chlorine (Collins, J. J., "A Report On Acid-Resistant Molecular Sieve Types AW-300 and AW-500", Molecular Sieves Product Data Sheet, Union Carbide International Co., 270 Park Avenue, New York, N.Y. 10017). Regeneration of the zeolite is accomplished by desorbing the water by purging with a hot gas at 300–600° F. (150–315° C.). Id. See also "Method for Dehydrating Butadiene-Hydrogen Chloride Mixture," Japanese Kokai 77 89,602 (Cl. C07C11/16) Jul. 27, 1977 [c.f. CA 87:202855q]. Activated synthetic mordenite has also been reported to be useful for drying hydrogen chloride: "Purification of Acidic Gases By Synthetic Mordenite," Japanese Kokai Tokkyo Koho JP 61 54,235 [86 54,235] [c.f. CA 105:8642t]; "Zeolite For Purification of Chlorine or Hydrogen Chloride for Semiconductor Use," Japanese Kokai 77 65,194 (cl. C01B7/02), May 30, 1977 [c.f. CA:87:103913a].

The acid-resistant mordenite-type zeolites such as AW-300 have an advantage over chlorosilylated alumina purifiers in that they are stable against alumina leaching due to the fact that the zeolite structure contains isolated tetrahedral $AlO_2$ units residing within a tetrahedral silica matrix. These units create water adsorption sites that are related to the ion exchange properties and capacity of the zeolite. In contrast, the alumina of chlorosilylated alumina is octahedral and has Al—O—Al chemical linkages which are more vulnerable to attack and destruction by acid gases.

While the high silica mordenites have certain advantages over chlorosilylated aluminas, they are not without disadvantages. Chlorosilylated aluminas purify by an irreversible chemical reaction of surface chlorosilyl groups with water, while high silica mordenites purify primarily by physical adsorption of the water, which is a reversible process. As a result, only a small amount of water can be removed from the gas during purification over high silica mordenites before water desorption becomes significant. In addition, since the efficiency of water removal by physical adsorption is lower than that of a chemical reaction, the high silica mordenites are less effective than chlorosilylated aluminas under parallel conditions.

Although the high silica mordenites do not suffer from the problem of alumina leaching associated with chlorosilylated aluminas, these zeolites typically generate unacceptable levels of metallic impurities when exposed to acid gases. These undesirable metallic emissions are less of a problem in the case of a synthetic mordenite with low metallic impurities, especially low in titanium (Ti) level. However, these zeolites still require preconditioning involving high-temperature treatment with the acid gas at high pressure (600 psi in the case of HCl, 330 psi in the case of HBr) to ensure complete removal of metal contaminants, such as magnesium (Mg) and iron (Fe). This preconditioning step causes partial destruction of the zeolite, resulting in loss of purifier capacity, formation of silicon halide and, in parallel, chemical generation of water according to:

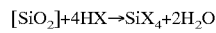

wherein X represents a halide and [SiO$_2$] represents a zeolite with a high silica to alumina ratio.

Thus, there is a need in the art for an acid gas resistant zeolite material that is capable of removing trace water from acid gases to very low levels, which does not generate unacceptable levels of metallic impurities when exposed to acid gases, and which does not require moisture-generating, expensive preconditioning with the acid gas to remove these metallic contaminants. Further, there is a need in the art for a zeolite for removing trace water from acid gases suitable for both applications at low pressure, and at full cylinder pressure.

Other methods of removing water contamination from acid gases which do not rely on the use of zeolites have been reported. For example, U.S. Pat. No. 4,844,719 to Toyomoto et al. discloses a method for desiccating a water-containing gas such as hydrogen chloride which comprises contacting the gas with one side of a permeable polymer membrane made of a fluorine type copolymer, and either bringing a dry purge gas into contact with the other side of the membrane, or reducing the pressure on the other side of the membrane, thereby removing water from the gas.

U.S. Pat. No. 4,925,646 to Tom et al. discloses a process for drying a gaseous hydrogen halide such as HCl, HBr, HF or HI. The method comprises contacting the gaseous hydrogen halide with an alkylated precursor composition which comprises metal alkyl compounds dispersed throughout a support and/or metal alkyl pendant functional groups covalently bound to a support. The gaseous hydrogen halide reacts with the metal alkyl to form a scavenger composition comprising the corresponding metal halide. The method further comprises contacting the scavenger composition with the water impurity-containing gaseous hydrogen halide, causing the metal halide to react with the water impurity to yield the corresponding hydrates and/or oxides of the metal halide, and recovering an essentially water-free gaseous hydrogen halide having a water concentration of below 0.1 ppm by volume.

U.S. Pat. No. 4,564,509 to Shealy et al. discloses a method for removing oxygen, water vapor and other oxygen bearing gas species from reactant gases by bubbling the reactant gas through liquid phase ternary melt of gallium-indium and an active gathering material selected from calcium, lithium, aluminum or magnesium. The oxygen in the gas reacts with the active gathering material, forming oxides. The method may be used to remove oxygen and water from hydrogen chloride.

U.S. Pat. No. 4,663,052 to Sherman et al. discloses the use of chabazite which contains a potassium, rubidium or cesium cation in a method to dry "acidic streams," such as reformer recycle hydrogen, flue gas, chloroform, trichloroethylene, vinyl chloride, chlorine, and generated hydrogen, which contain HCl as an acid component (col. 5, lines 5–17). The chabazite adsorbent of Sherman et al. is activated at a temperature of 100° C. or greater, preferably between 200° to 600° C., in the presence of air or other gases (col. 5, lines 51–58).

However, these methods can result in contamination of the gas with other impurities such as oxides or metals. Moreover, these methods are generally not practical on the large scale required in semiconductor manufacturing.

Thus, there is a need in the art for a material that is capable of removing trace amounts of water from an acid gas, which is resistant to reaction with the acid gas, and in particular, which is resistant to both leaching of aluminum and physical degradation. Further, there is a need in the art for a moisture-absorbing material which is capable of removing trace amounts of water from an acid gas which does not require a time consuming, expensive preconditioning step with the acid gas during which water is initially generated, with a concomitant temperature increase.

3. SUMMARY OF THE INVENTION

The present invention encompasses a method for removing water from a gas, in particular from an acid gas such as hydrogen chloride or hydrogen bromide, which comprises contacting the gas with a zeolite having a high silica-to-alumina ratio, wherein the zeolite has been heated prior to contacting it with the gas to a temperature above 650° C. Preferably, such heating is sufficient to remove an amount of water from the zeolite, believed to be produced by dehydroxylation of the zeolite, but insufficient to cause chemical and physical destruction of the zeolite.

The present invention is also directed to a method for removing water from a gas comprising heating a zeolite to a temperature of about 400° C. for a period of time sufficient to desorb a first amount of water that is physically absorbed onto the zeolite, wherein the zeolite has a high silica-to-alumina ratio, followed by heating the zeolite to a temperature above about 650° C. for a period of time sufficient to remove a second amount of water from the zeolite, believed to be produced by dehydroxylation of the zeolite, thereby forming a superheated zeolite, and subsequently contacting the superheated zeolite with the gas, and allowing the superheated zeolite to absorb the water from the gas.

The present invention also relates to a superheated zeolite, which has been heated to a temperature above about 650° C. sufficient to remove an amount of water from the zeolite, which is believed to be removed from the zeolite by dehydroxylation, wherein the superheated zeolite has a high silica-to-alumina ratio, and low metals content.

The present invention is also directed to a method of preparing a dehydroxylated zeolite, comprising heating the zeolite to a temperature of about 400° C. for a period of time sufficient to desorb a first amount of water that is physically absorbed on the zeolite, followed by heating the zeolite to a temperature of above about 650° C. for a period of time sufficient to remove a second amount of water from the zeolite by dehydroxylation of the zeolite.

4. BRIEF DESCRIPTION OF THE FIGURES

FIG. 1: Thermogravimetric Analysis (TGA) scan of a 65.9 mg sample of a mordenite zeolite manufactured by Tosoh (Japan. The TGA scan was run as described in Example 1(A).

Figure 2:
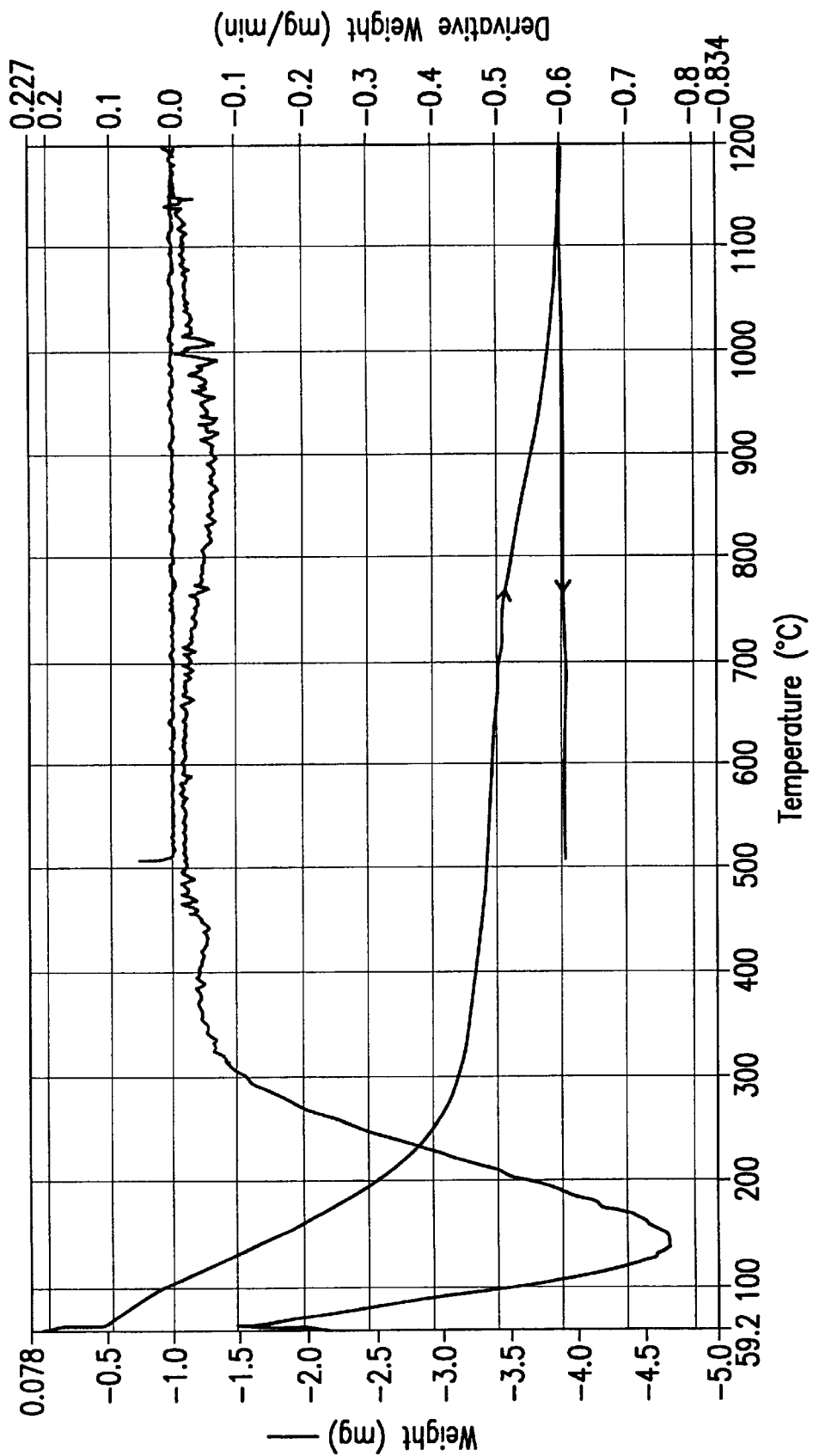

FIG. 2: TGA scan of a 64.7 mg sample of Tosoh mordenite zeolite. The TGA scan shows a main $H_2O$ desorption (weight loss) peak centered at 140° C., and a second peak centered at about 890° C. The TGA scan was run as described in Example 1(B).

Figure 3:
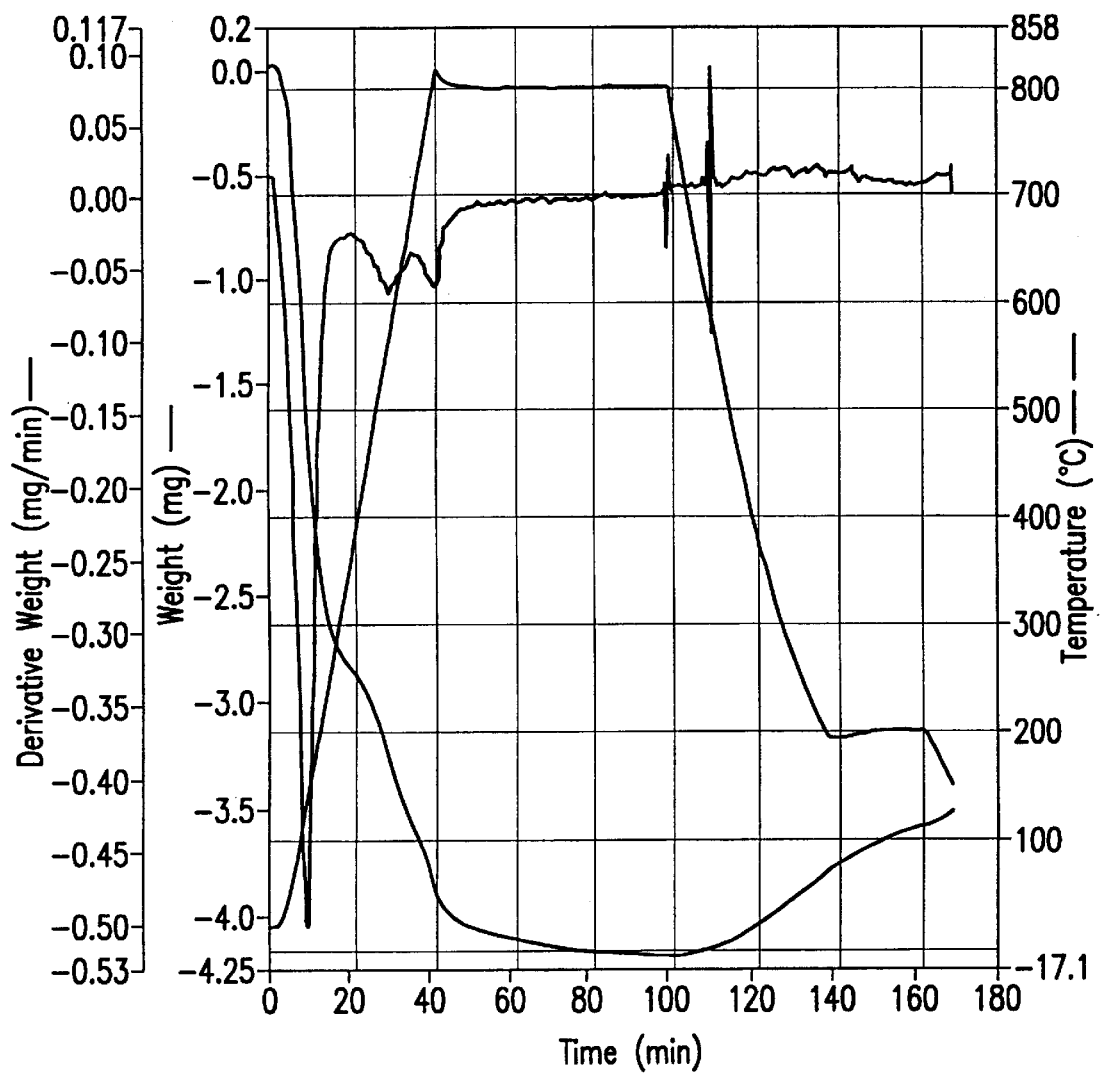

FIG. 3: TGA scan of a 68.7 mg sample of United Catalysts (UC) mordenite zeolite heated to 800° C. The TGA scan shows a main low-temperature water peak and two high-temperature peaks at about 580° C. and about 800° C. The TGA scan was run as described in Example 1(C).

Figure 4:
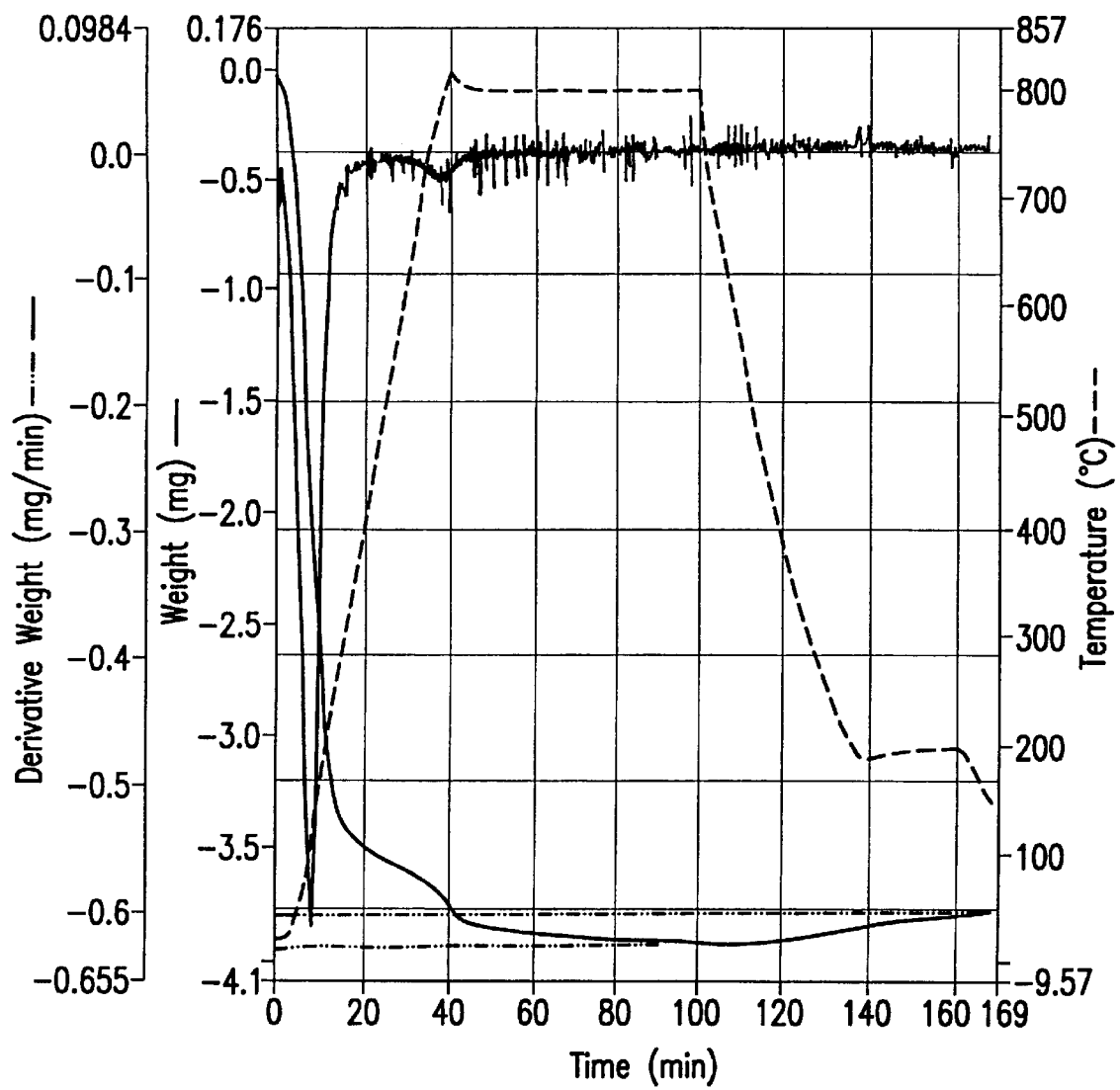

FIG. 4: TGA scan of a 66.6 mg sample of Tosoh mordenite zeolite. The TGA scan shows that the sample loses water in an amount of about 3.5% by weight of the sample at low temperature (peak at 130° C.) and water in an amount of about 0.3% by weight of the sample at about 800° C. The TGA scan was run as described in Example 1(D).

Figure 5:
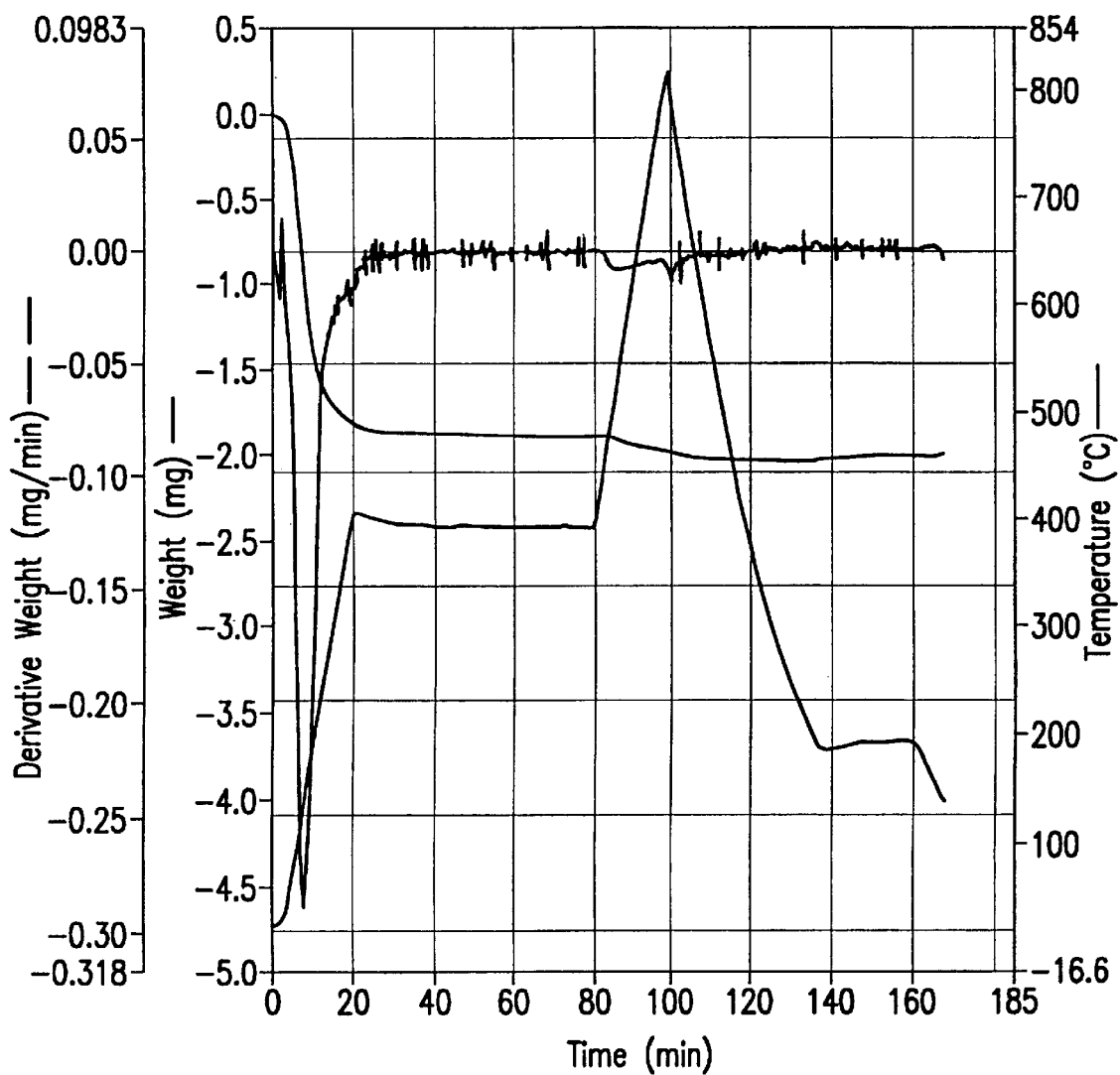

FIG. 5: TGA scan of a 66.6 mg sample of Tosoh mordenite zeolite, which shows low and high temperature water peaks for the Tosoh mordenite zeolite as obtained during staged heating to 400 and 800° C. The TGA scan was run as described in Example 1(E).

Figure 6:
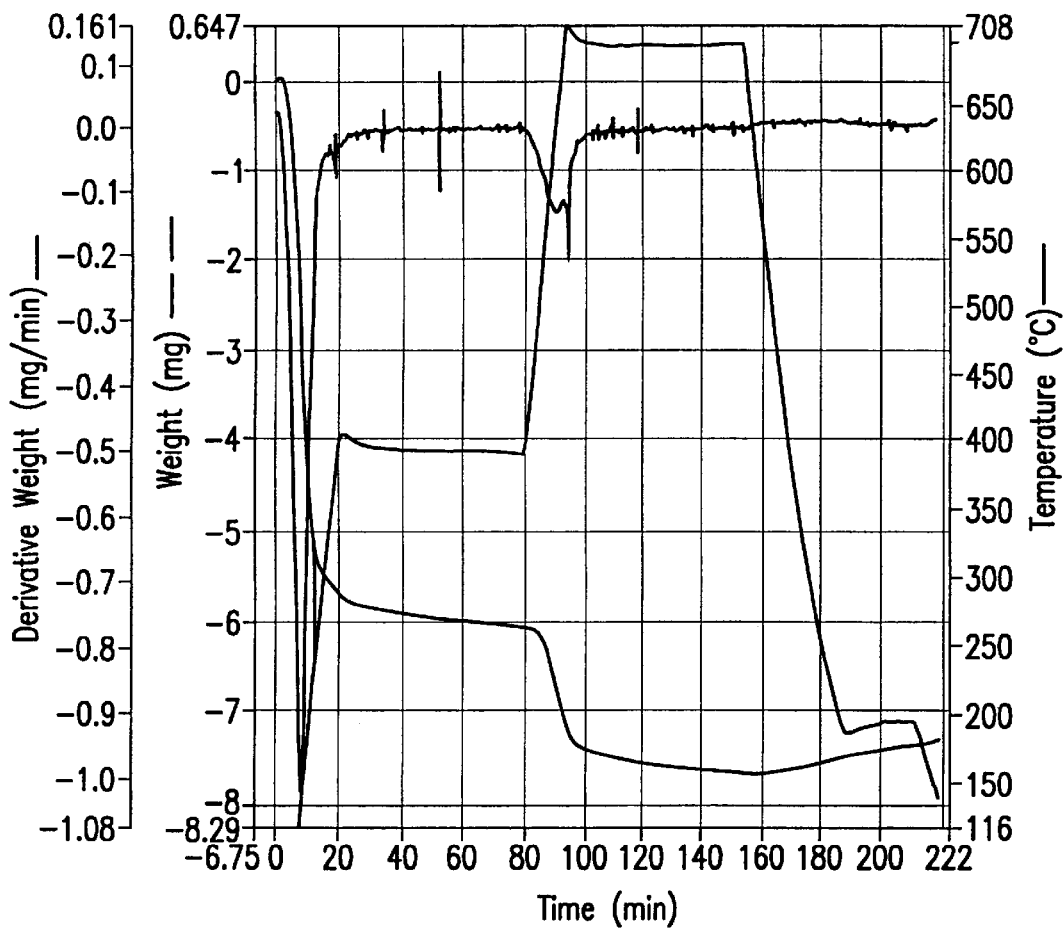

FIG. 6: TGA scan of staged heating to 400 and 700° C. of a 119.3 mg sample of United Catalysts (UC) mordenite zeolite. The TGA scan shows that there is more water loss at high temperature, i.e., about 1.3% of dehydrated sample. The TGA scan was run as described in Example 1(F).

Figure 7:
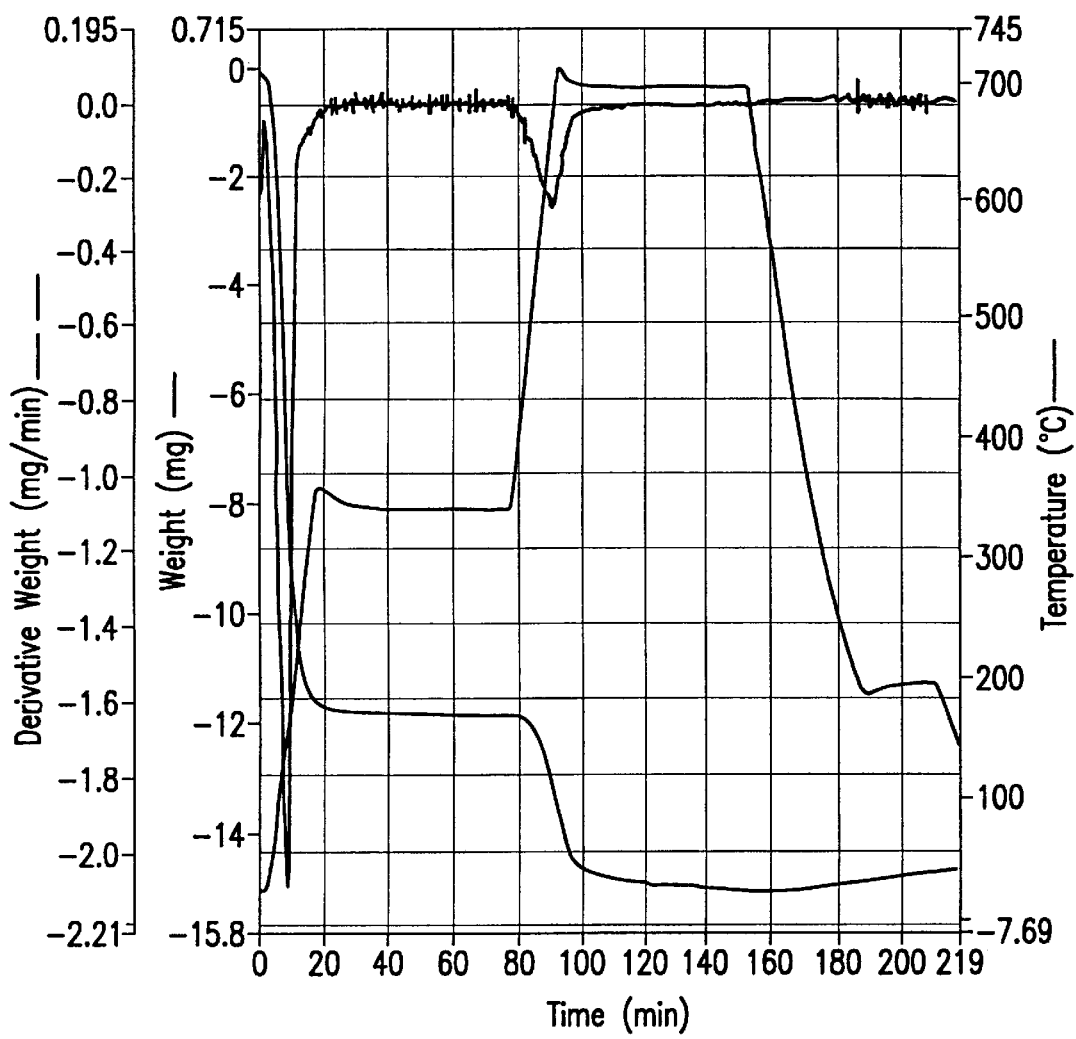

FIG. 7: TGA scan of staged heating of a 245.4 mg sample of United Catalysts (UC) mordenite zeolite to 3500 and 700° C. The TGA scan was run as described in Example 1(G).

Figure 8:
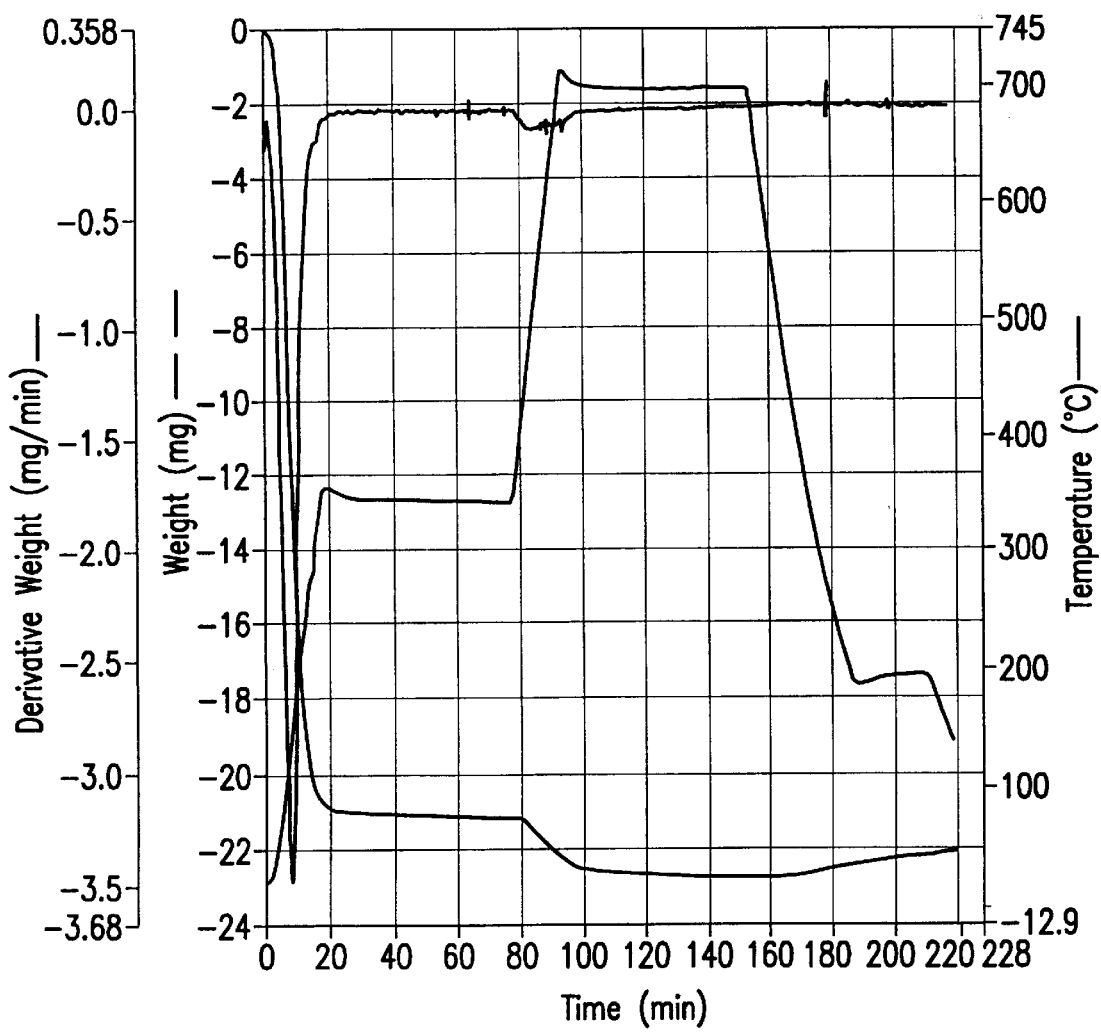

FIG. 8: TGA scan of re-run of the 245.4 mg sample of FIG. 7 (Example 1(G)) after rehydration of the sample at ambient conditions (about 25% humidity). The TGA scan shows that significantly less high temperature water is desorbed. The TGA scan was run as described in Example 1(H).

Figure 9:
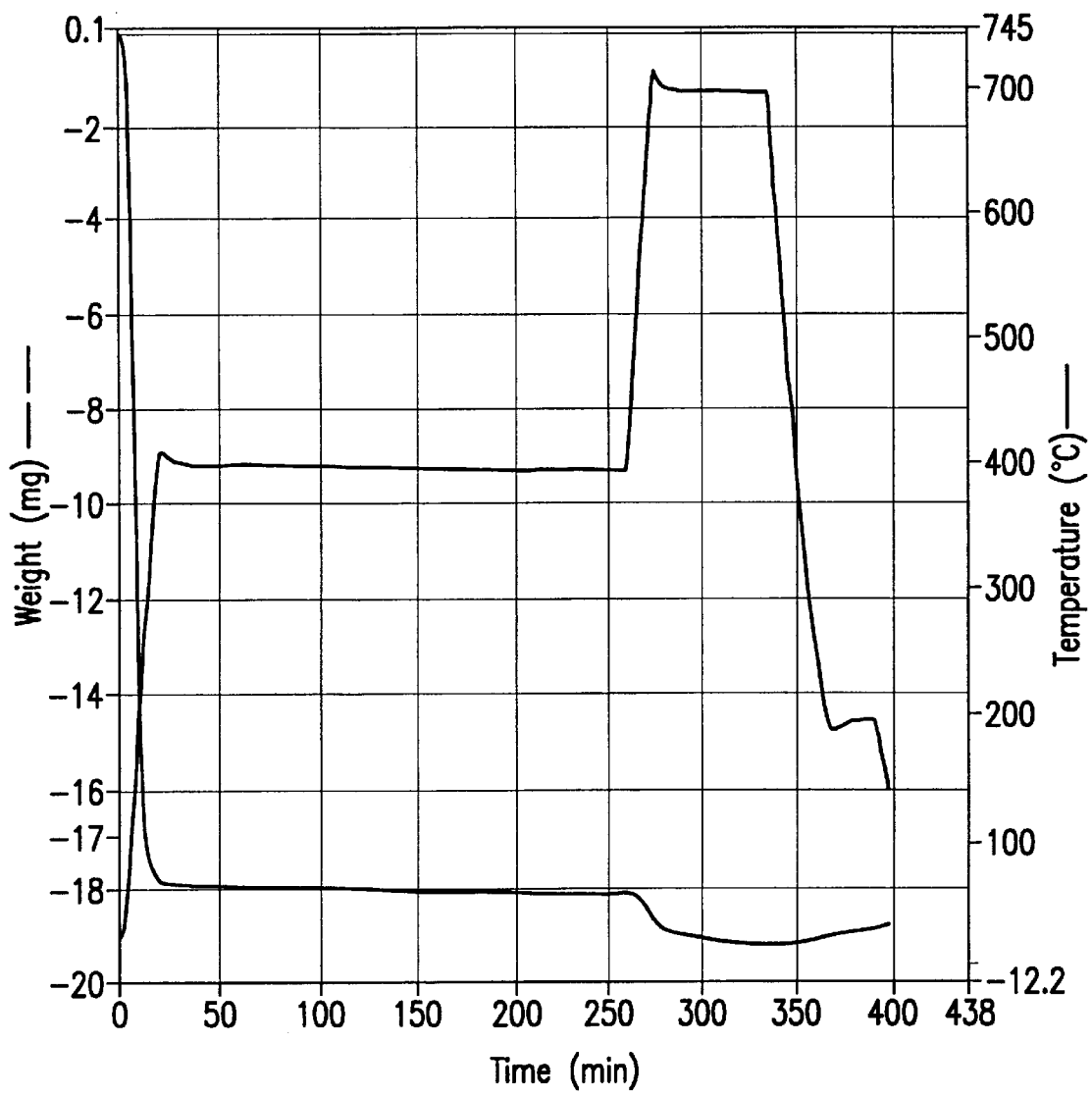

FIG. 9: TGA scan of staged heating of a 329.2 mg sample of Tosoh mordenite zeolite. The TGA scan was run as described in Example 1(I).

Figure 10:
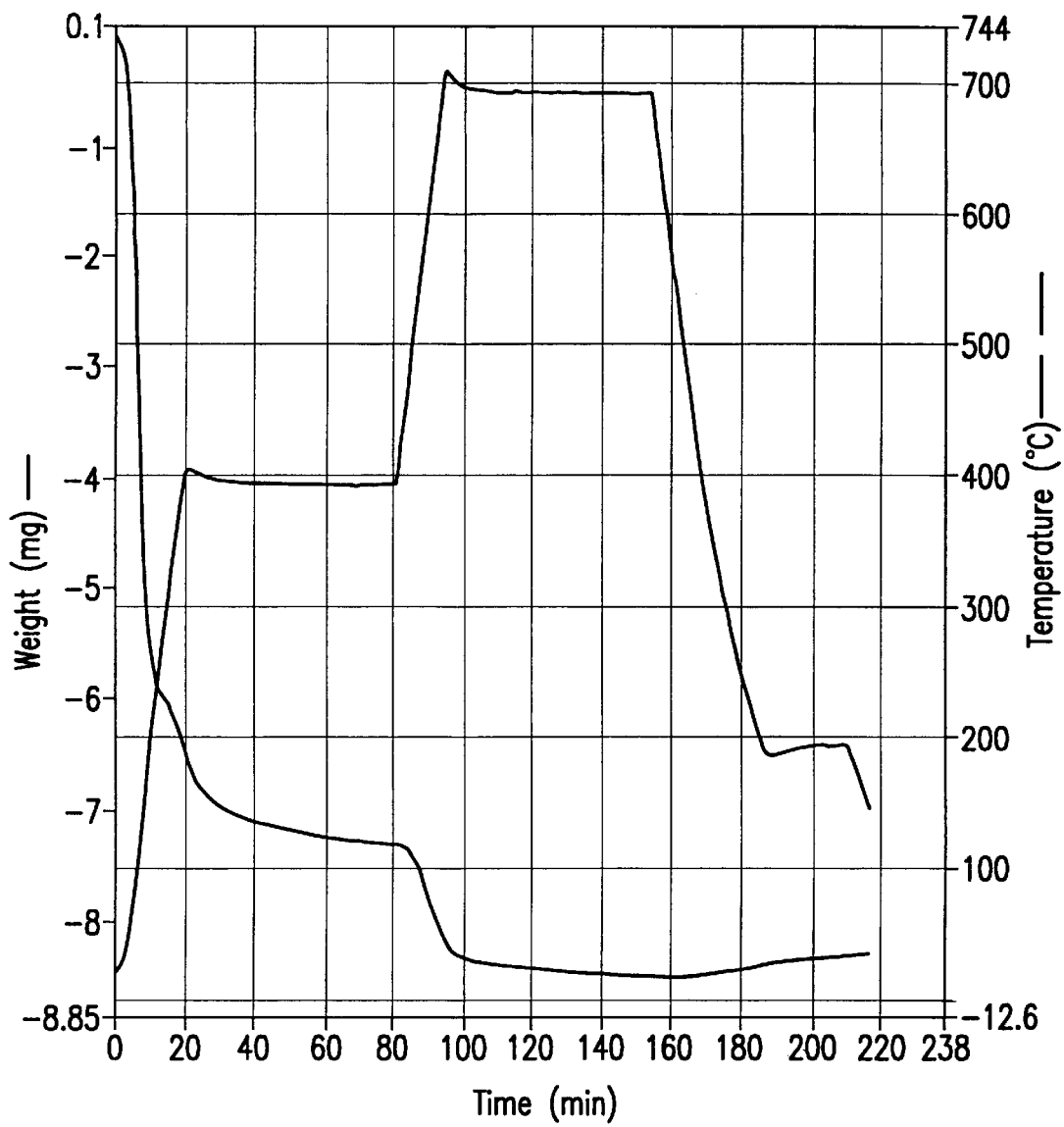

FIG. 10: TGA scan of a 69.0 mg sample of PQ mordenite zeolite stage-heated to 400 and 700° C. The TGA scan shows that about 15% of weight loss occurs during second temperature ramping. The TGA scan was run as described in Example 1(J).

Figure 11:
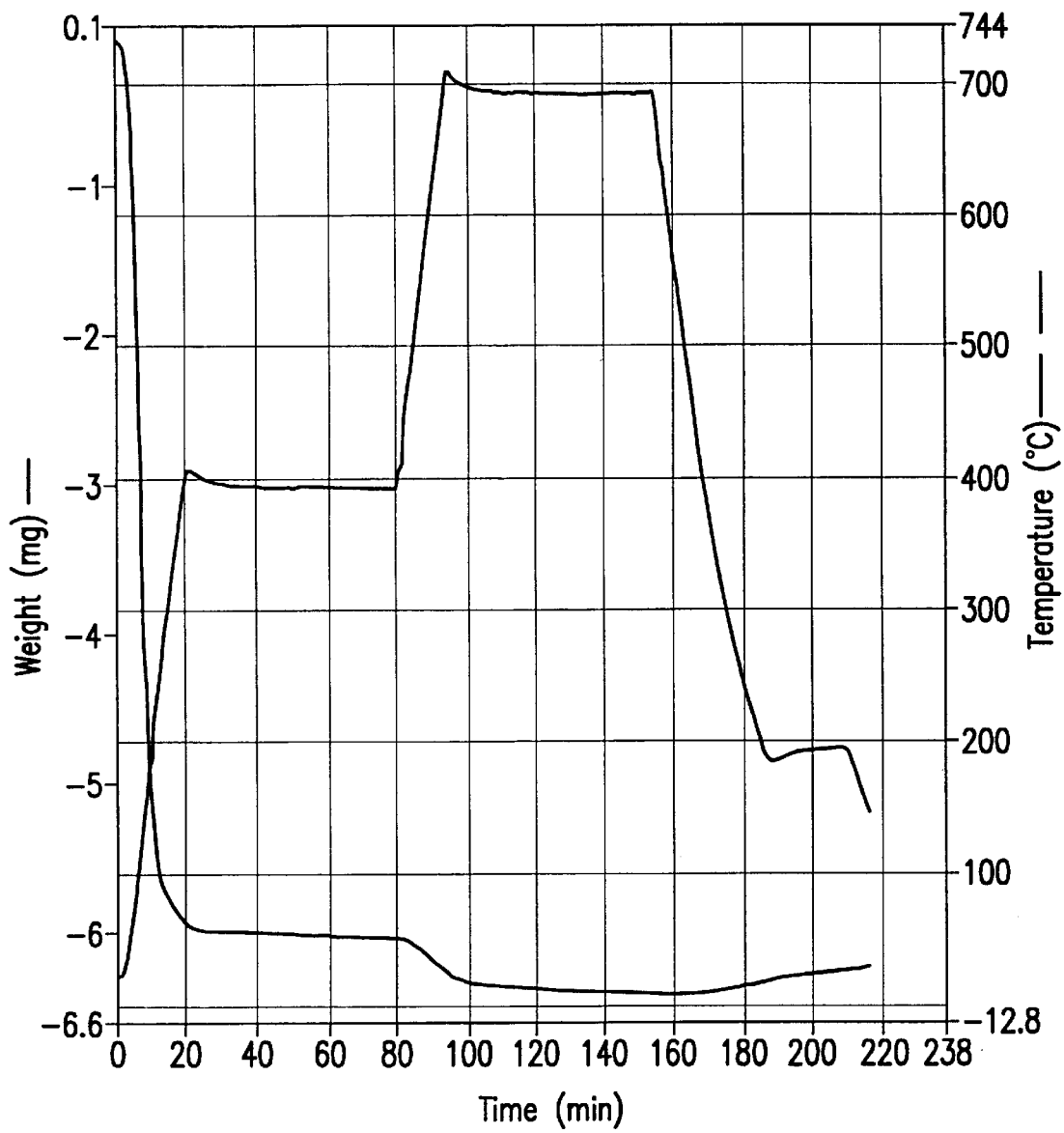

FIG. 11: TGA scan of repeat of FIG. 10 (Example 1(J)). The TGA scan shows that weight loss at high temperature is about one-third of what it was before. The TGA scan was run as described in Example 1(J).

Figure 12:
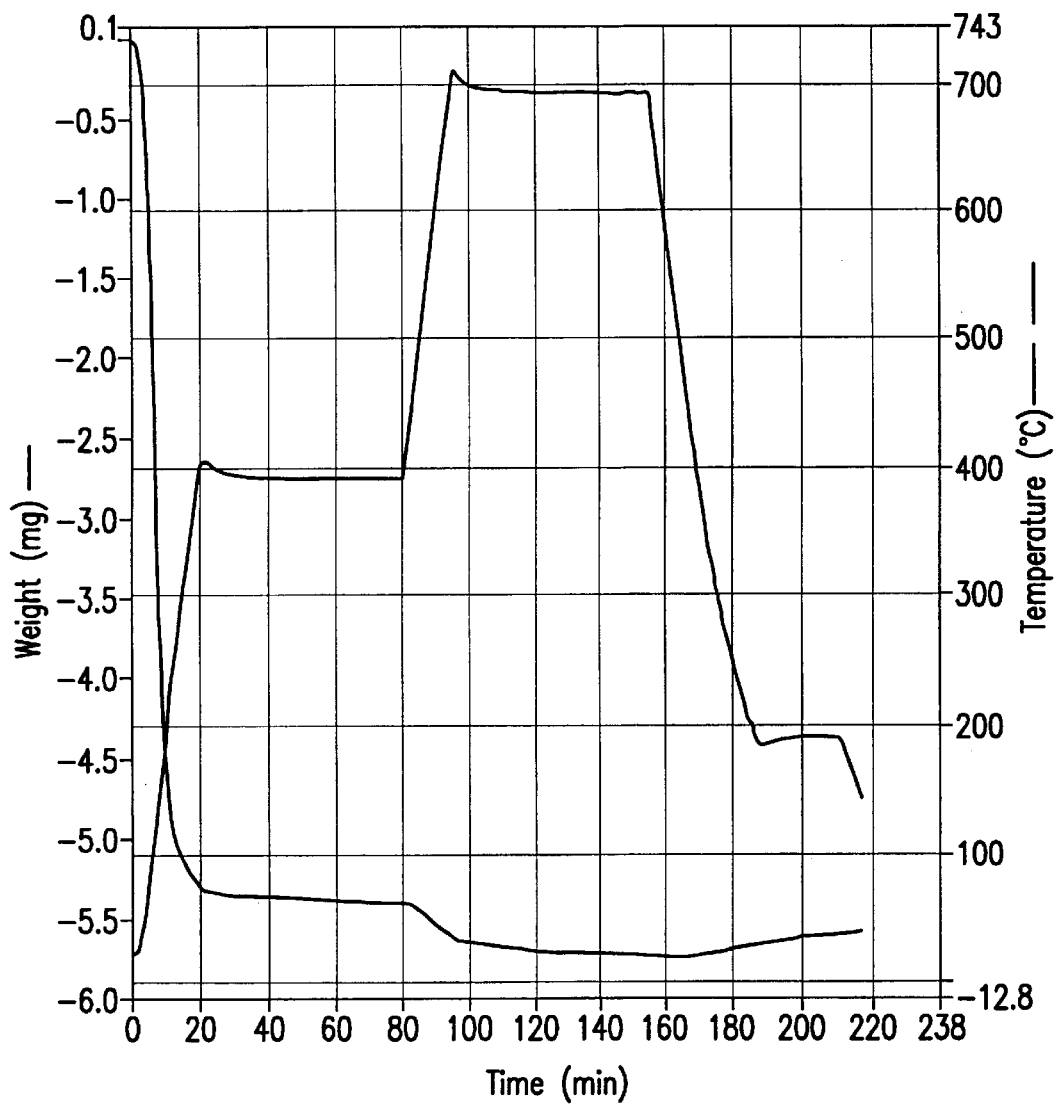

FIG. 12: Repeat TGA scan of the TGA scan shown in FIG. 11, run as described in Example 1(J). The repeat TGA scan shows essentially the same results.

Figure 13:
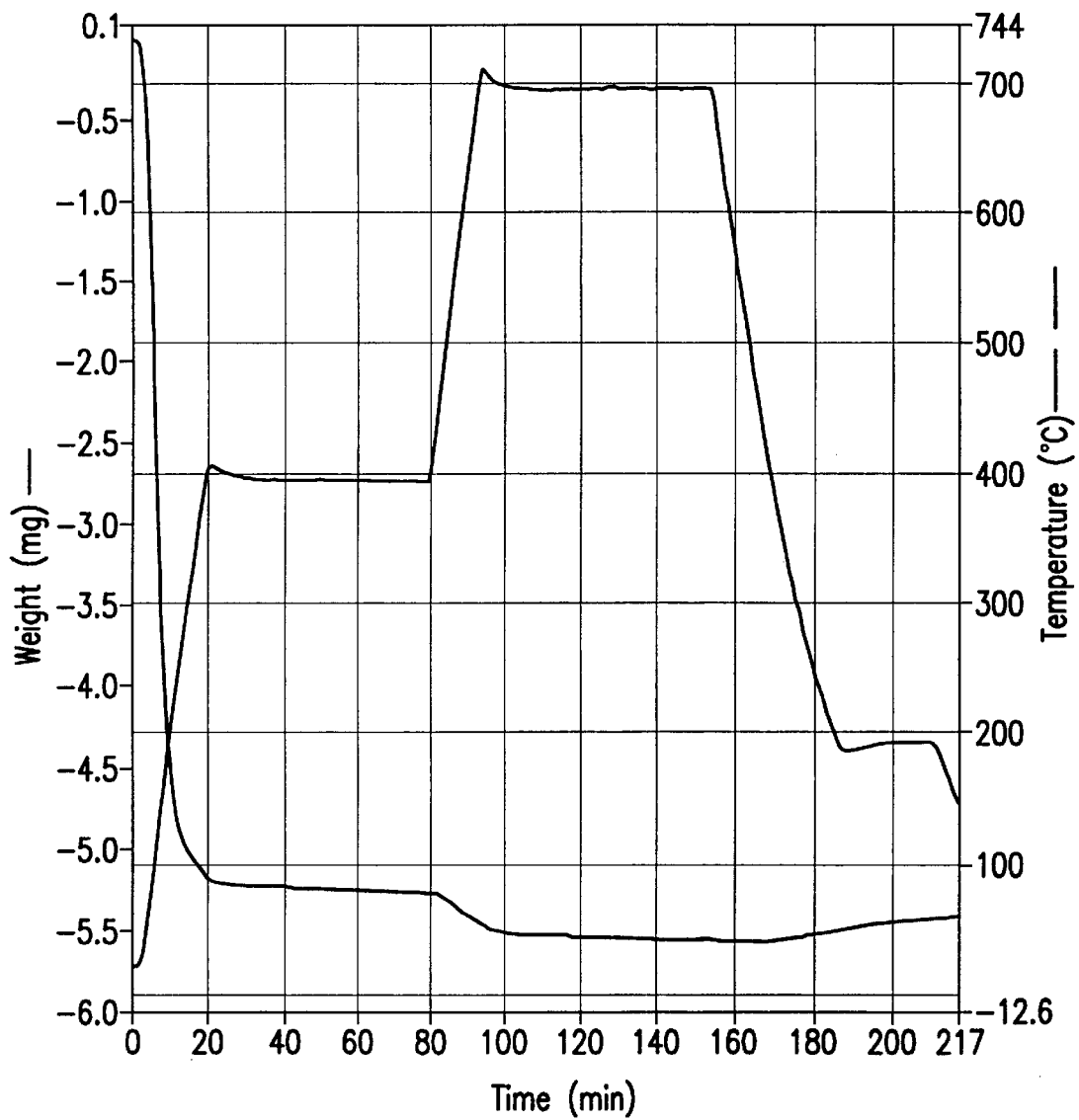

FIG. 13: Repeat TGA scan of the TGA scan shown in FIG. 12, run as described in Example 1(J). The repeat TGA scan shows essentially the same results.

Figure 14:
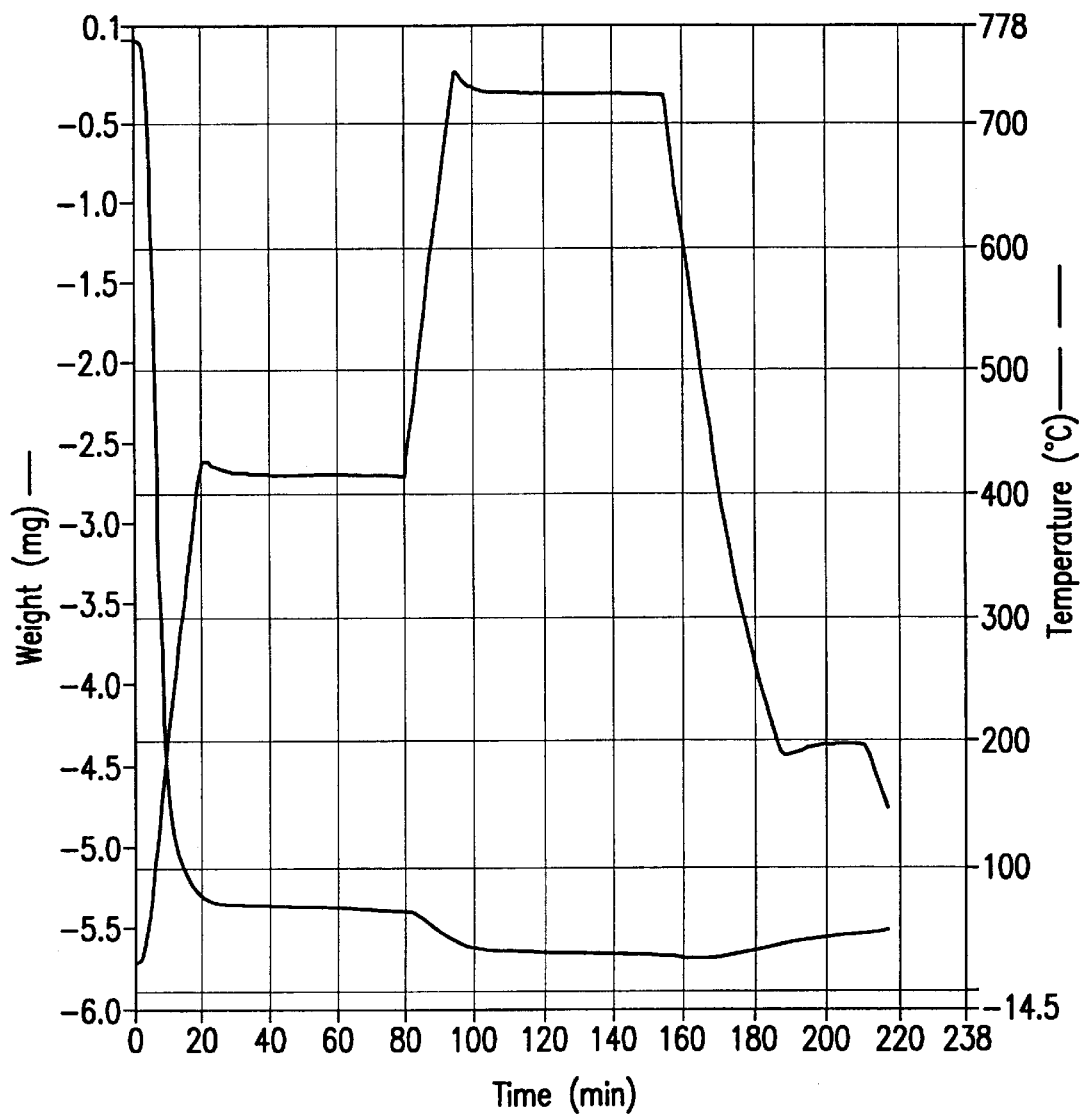

FIG. 14: Repeat TGA scan of the TGA scan shown in FIG. 13, run as described in Example 1(J). The repeat TGA scan shows essentially same results. The TGA scans of FIGS. 10, 11, 12 and 13 demonstrate that reproducibility of water removal from calcined—rehydrated mordenite is excellent. About one-half percent weight loss occurs above 400° C. (about 5% of entire weight loss).

Figure 15:
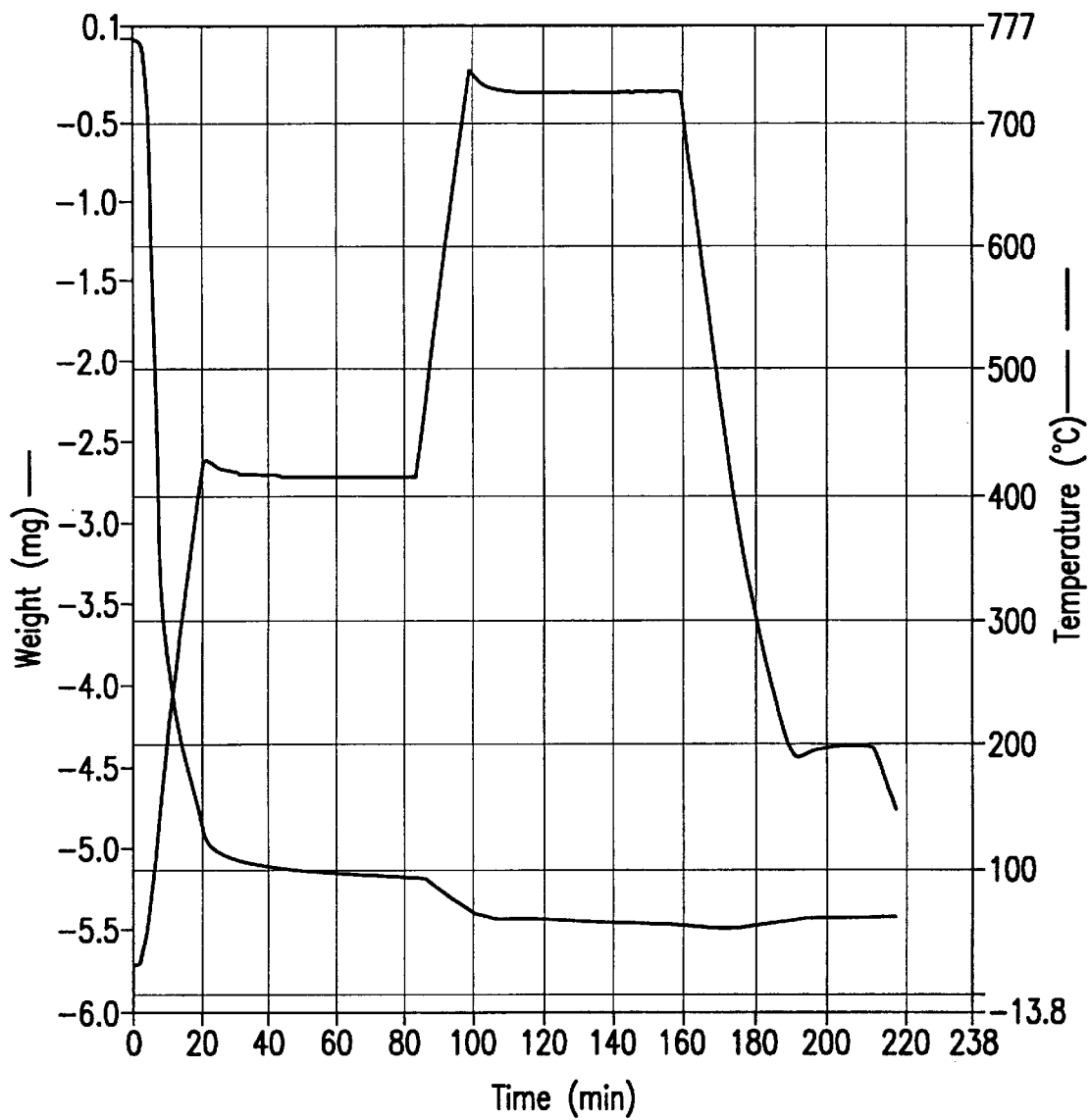

FIG. 15: TGA scan of a 46.1 mg sample of PQ mordenite zeolite beta stage heated to 400 and 700° C. The TGA scan shows 5.2 mg weight loss during first ramping (11% by weight of the sample), and 0.3 mg weight loss during second ramping (0.5% by weight of the sample). The TGA scan was run as described in Example 1(K).

Figure 16:
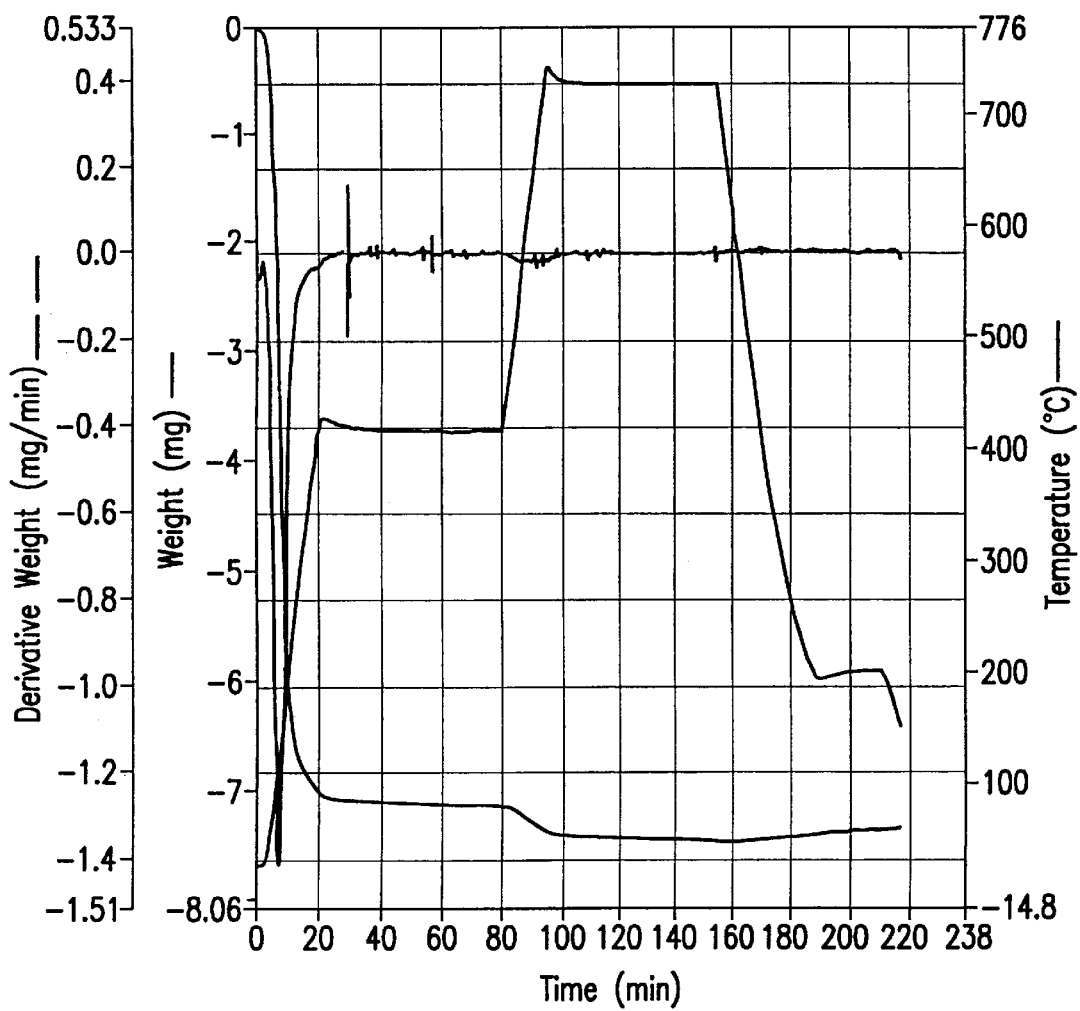

FIG. 16: TGA scan of a sample of PQ Type Y zeolite stage heated to 400 and 700° C. The TGA scan shows that about 0.5% of the weight loss occurs during second ramping. The PQ Type Y zeolite has essentially similar behavior to mordenite. The TGA scan was run as described in Example 1(L).

Figure 17:
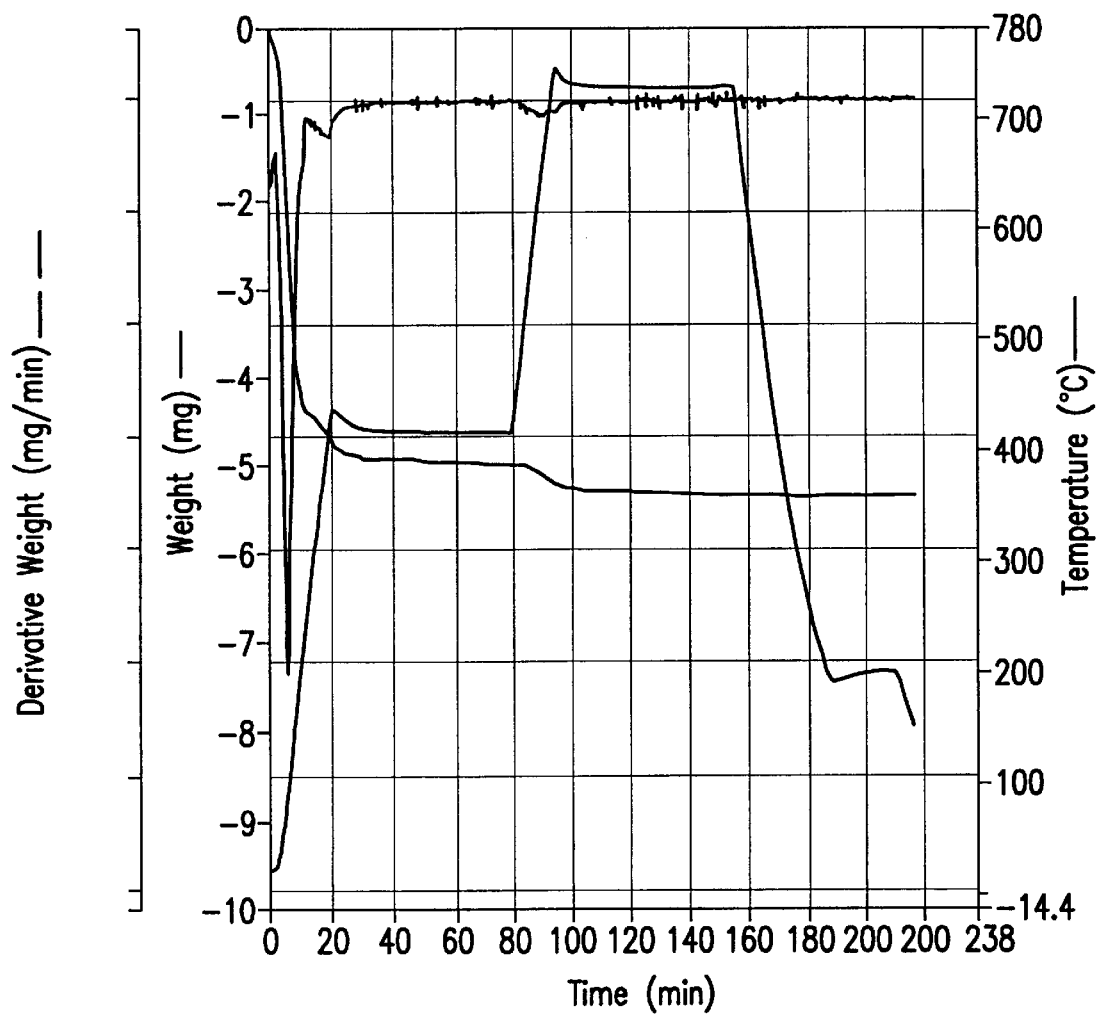

FIG. 17: TGA scan of a 73.8 mg sample of PQ ZSM-5 stage heated to 400 and 700° C. The TGA scan shows about 5.0 mg weight loss during first ramping (about 6.5% by weight of the sample), and about 0.3 mg weight loss during second ramping (0.4% by weight of the sample). The TGA scan was run as described in Example 1(M).

Figure 18:
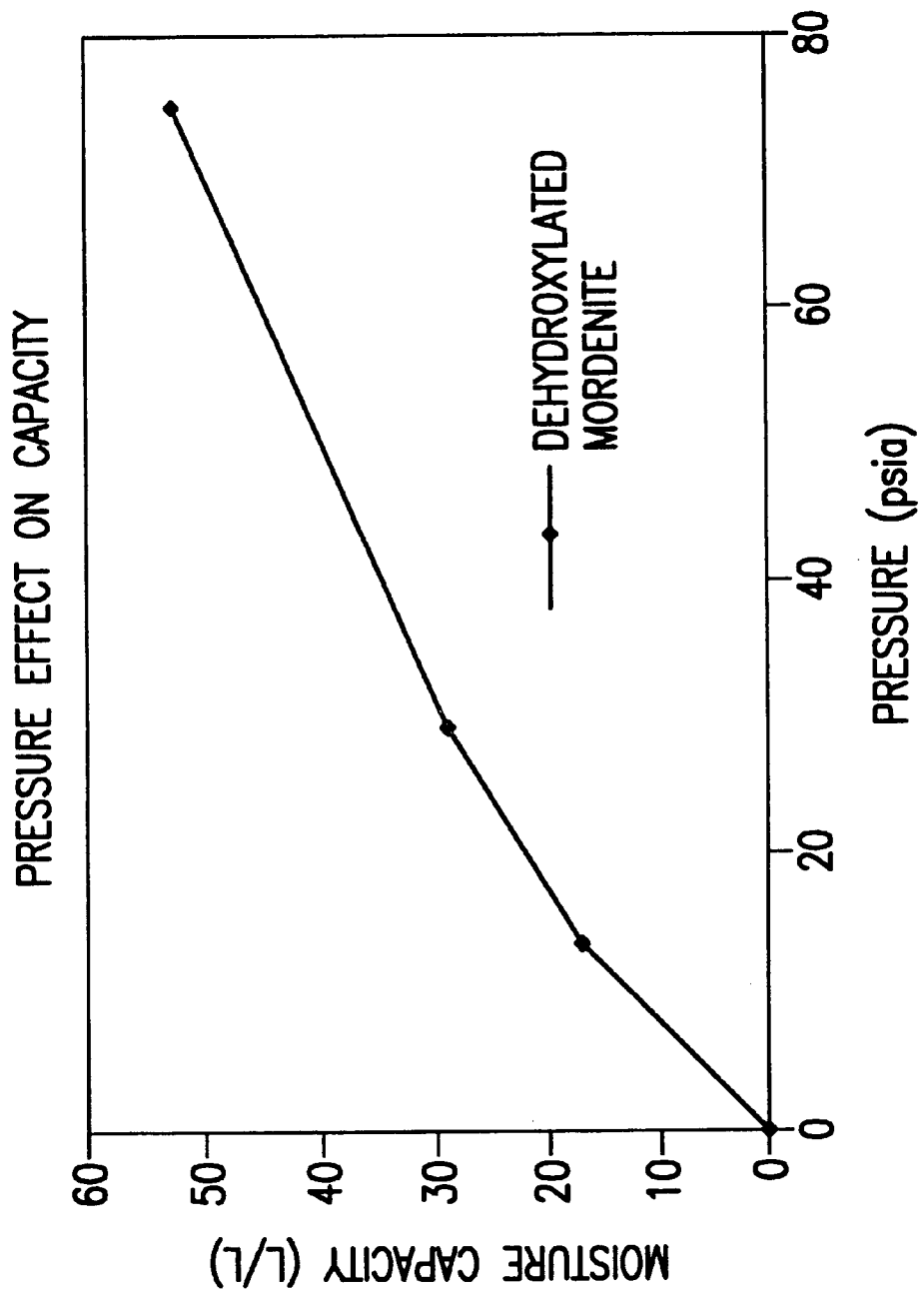

FIG. 18: Graph depicting the effect of gas pressure (psia) on the water capacity (L/L) of dehydroxylated mordenite, as described in Example 4. The graph shows the effect of pressure on the adsorption of water onto the purifier, and that using high pressure matrix gas can dramatically increase the purifier capacity.

5. DETAILED DESCRIPTION OF THE INVENTION

The present invention is directed to a method for removing trace moisture from an acid gas, which comprises contacting the gas with a zeolite having a high silica-to-alumina ratio, wherein the zeolite has been heated to a temperature in excess of about 650° C. The term "superheated" used herein to describe the zeolites of the invention and useful in the methods of invention means that the zeolite has been heated to a temperature of about 650° C. or higher. Such heating is believed to cause dehydroxylation of the zeolite. We have discovered that superheated zeolites have the ability to effectively adsorb water from acid gases such as hydrogen chloride or hydrogen bromide to less than 0.1 ppm moisture, while avoiding the problems of dealumination associated with chlorosilylated alumina. Moreover, superheated zeolites used in the methods of the invention do not require costly, inconvenient and moisture-generating preconditioning steps with the acid gas to be purified. Thus, the present invention eliminates the problem of initial moisture generation associated with chlorosilylated aluminas and conventional zeolite purifiers.

The present invention is also directed to a method of preparing a dehydroxylated zeolite, comprising heating the zeolite at a temperature of about 400° C. for a period of time sufficient to desorb a first amount of water that is physically absorbed on the zeolite, followed by heating the zeolite to a temperature of above about 650° C. for a period of time sufficient to remove a second amount of water from the zeolite by dehydroxylation of the zeolite.

The present invention is also directed to a superheated zeolite, comprising a mordenite-type zeolite which has been heated to a temperature above about 650° C. sufficient to remove an amount of water from the zeolite by dehydroxylation, wherein the superheated zeolite has a high silica-to-alumina ratio, and a low metals content.

The present invention is also directed to a dehydroxylated zeolite, which has been heated at a temperature of about 400° C. for a period of time sufficient to desorb a first amount of water that is physically absorbed on the zeolite, and heated to a temperature of above about 650° C. for a period of time sufficient to remove a second amount of water from the zeolite by dehydroxylation of the zeolite, wherein the zeolite has a high silica-to-alumina ratio, and a low metals content.

The zeolites of the present invention should have low levels of iron, titanium and magnesium. Preferably, the zeolites of the invention have less than about 20 ppm titanium, less than about 100 ppm iron, and less than about 11 ppm magnesium. In addition, it is preferred that the zeolites of the invention have less than about 1% by weight sodium as $Na_2O$.

Conventional zeolite purifiers such as mordenites used to remove moisture from acid gases are typically activated before use at temperatures ranging from 300–400° C. At these temperatures, practically all the physically adsorbed water is eliminated through desorption. Calcination of mordenite catalysts is usually performed at more elevated temperatures up to about 650° C. with no additional water loss. However, if mordenite is subjected to temperatures higher than about 650° C. (i.e., superheated), another portion of water is released, believed to be the result of a dehydroxylation reaction involving two hydroxyl groups of the acidic zeolite form (H-M) per one water molecule. This is the edge of the zeolite thermal stability beyond which the zeolite microporous structure collapses. However, superheated mordenite, if not left at the superheating temperature for an extended period, is fairly stable.

Mordenite with a high silica-to-alumina ratio in its acidic zeolite form (H-M) is a strong Brønsted acid. Through the dehydroxylation reaction occurring under superheating conditions, the Brønsted acid sites are converted to extremely hygroscopic Lewis acid sites, according to the equation:

Dehydroxylated mordenite has been known for two decades: Kuhl, G. H., 1977, "Acidity of Mordenite," *Molecular Sieves-II*, James R. Katzer, Ed., ACS Symposium Series 40, Chapter 9, pages 96–107. Kuhl discloses dehydroxylation of a mordenite zeolite during a temperature range of 525–880° C. in which the zeolite was heated at a rate of 5° C. per minute. However, the process of Kuhl does not address the phenomenon known as "steaming" in which the physically adsorbed water reacts with the zeolite at temperatures above 400° C. as it is desorbed, thereby chemically modifying the zeolite and rendering it less effective as a moisture absorbing material. The process for preparing a dehydroxylated zeolite of the present invention avoids the problem of steaming by maintaining the zeolite at a temperature of about 400° C. for a sufficient time to remove all the physically absorbed water. At temperatures of about 400° C. or less, the physically desorbed water does not react with the zeolite, and the problem of steaming is avoided. Moreover, Kuhl does not teach dehydroxylated zeolites having low metals content.

We have unexpectedly found that dehydroxylated mordenite has the ability to effectively resorb water from an acid gas stream. The present invention combines the high efficiency of water removal by strong Lewis acids with the high capacity of dehydroxylated mordenite for chemical water to afford an acid resistant zeolite of superior purifying properties. It is also believed by the inventors that effective elimination of surface hydroxyl groups reduces dramatically the water forming reaction, with acid gases (e.g, HCl, HBr) at low temperatures, according to:

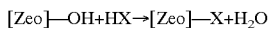

wherein X represents a halide and [Zeo] represents a zeolite.

The preferred zeolites of the invention are mordenite-type zeolites. In a preferred embodiment, the silica-to-alumina ratio of the zeolite is about 10 to about 30; particularly preferred are zeolites with silica-to-alumina ratios in the range of about 15 to about 20. Other zeolites with high silica-to-alumina ratios, in their H-form (i.e., acidic form), may also be used in the methods of the invention.

The zeolites used in the present invention may have a variety of particle sizes. For example, zeolites having particle sizes in the range of 1–10 mm may be used. In addition, the zeolites used in the invention may comprise a mixture of particle sizes, or may have a roughly uniform particle size. Preferably, the zeolites used in the invention have a uniform particle size of about 1–1.5 mm (i.e., about ¹⁄₁₆ inch). More preferably, the zeolite used in the invention is in the form of uniform spherical beads having a diameter of about 1–1.5 mm. Alternatively, the zeolite may be in the form of cylindrical pellets. Preferably, the cylindrical pellets have a height of about 1–1.5 mm and a cross-sectional diameter of about 1–1.5 mm; although a mixture of particle sizes may be used.

Examples of mordenite-type zeolites which may be used in the present invention include T-2581 Heterogeneous Catalyst, available from United Catalysts, Inc. Louisville, Ky. and zeolite mordenite CBV 20A, manufactured by the PQ Corporation, Valley Forge, Pa., which may be purchased from Zeolyst International Products, Valley Forge, Pa. Examples of other zeolites in addition to mordenite which may be used in the methods of the invention are the high silica-to-alumina ZSM-5 (MFI), ZSM-11 (MEL), beta (BEA), faujasite USY (FAU), hexagonal faujasite, also known as BSS (EMT), ferrierite (FER) and chabazite (CHA).

It is preferred that the zeolites of the invention have low levels of metallic impurities. In particular, it is preferred that the levels of titanium (Ti) and iron (Fe) in the zeolite are low. Preferably, the zeolite used in the methods of the present invention is a synthetic mordenite with low metals content; however, natural mordenites may also be used. A particularly preferred zeolite is high metal purity mordenite, available from Tosoh, Inc. in Japan ("the Tosoh zeolite"). This low metals mordenite may be purchased from Tosoh USA, 1100 Circle 75 Parkway, Suite 600, Atlanta, Ga. 30339, as supplier part no. "H-mordenite." This zeolite is a synthetic mordenite-type zeolite with a silica-to-alumina ratio of about 15, containing about 20% silica binder (final silica-to-alumina ratio is about 19). The Tosoh zeolite is particularly preferred because it has a low level of titanium impurity, i.e., less than about 20 ppm titanium. The Tosoh zeolite also has very low levels of iron (less than about 100 ppm) and magnesium (less than about 11 ppm).

The total amount of water removed by dehydroxylation (i.e., "chemical water") of the Tosoh zeolite is 0.5–0.6 wt % of the zeolite. This corresponds to about 6 liters of water vapor at standard temperature and pressure ("s.t.p.") per liter of zeolite, removed by dehydroxylation. Thus, the dehydroxylated Tosoh zeolite has the capacity to reabsorb about 6 liters of additional water vapor from a gas stream, as opposed to lower-temperature activated mordenite. The total amount of physically absorbed water, which is removed by heating the zeolite to about 400° C., is about 14 liters of water vapor (at s.t.p.) per liter of zeolite. This increases the overall water capacity as measured at atmospheric pressure (for example, by an FT-IR method) above the value of just the capacity for chemical water obtained by the rehydroxylation reaction. Therefore, about 20 lit s.t.p./lit capacity to water removal is realized with the superheated mordenite according to the present invention. However, the additional capacity due to physical water adsorption is utilized at the expense of potentially somewhat reduced purification efficiency. Thus, while the zeolite activated at conventional temperatures (i.e., about 400° C.) has the capacity to physically adsorb only about 14 liters of water vapor (s.t.p.), the zeolite activated according to the methods of the invention has the capacity to absorb about 20 liters of water vapor through a combination of "chemical" and physical adsorption.

Superheating of the zeolite is performed at a temperature above about 650° C., but lower than the temperature at which the micropores of the zeolite collapse. In the case of the Tosoh zeolite, pore collapse takes place at temperatures in excess of 900° C. However, the upper limit of the heating will vary depending on the type of zeolite and its pore configuration. The zeolite may be kept at or above 650° C. for a sufficient time to dehydroxylate a sufficient amount of chemical water from the zeolite sample. Preferably, the zeolite of the invention is maintained at the elevated temperatures for approximately one hour, but not more than about 6–8 hours, to minimize structural damage that may result in lower water capacity. Preferably, the zeolite is allowed to cool to ambient temperature in the presence of moisture-free atmosphere (e.g., under Nanochem®-purified nitrogen) prior to contacting it with the gas to be purified; however, the zeolite may be used while still somewhat hot, e.g., less than about 300° C.

The methods of the present invention may be used to remove water from almost any non-basic gas; however, the invention is particularly useful for removing trace water from acid gases, including hydrogen chloride and hydrogen bromide, in particular at cylinder pressure (about 320 psi for HBr; about 620 psi for HCl), for which no other effective purifiers seem to exist. The methods of the invention are also suitable for removing moisture from a wide variety of gases used in the semiconductor industry, including halide gases such as chlorine, boron trichloride, boron trifluoride, nitrogen trifluoride, sulfur hexafluoride, silanes (especially chlorosilanes), silicon tetrachloride, silicon tetrafluoride, tungsten hexafluoride, carbon tetrafluoride, and phosphorus pentafluoride; other chemicals used in the semiconductor industry such as hydrogen fluoride; hydridic gases such as arsine ($AsH_3$), phosphine ($PH_3$) and silane ($SiH_4$); and bulk gases such as nitrogen ($N_2$), oxygen ($O_2$), hydrogen ($H_2$), carbon dioxide ($CO_2$), argon (Ar), and helium (He).

5. EXAMPLES

Example 1

Thermogravimetric Analysis (TGA) of Zeolites

Example 1(A)

A 65.900 mg sample of zeolite manufactured by Tosoh, Japan (lot no. HSZ-640HOD, Z-951201, pellet diameter 1.5 mm, bulk density 0.58 g/ml, crush strength (hydrous) 0.22 kg/mmL, surface area (langmuir) 490 m²/g, cylindrical pellets with cross sectional-diameter 1–1.5 mm) was prepared by briefly purging it with nitrogen. The Thermogravimetric Analysis (TGA) was performed on a Perkin-Elmer TGA-7 thermogravimetric instrument. The sample was heated to 35° C. and held for one minute. The temperature was then increased to 400° C. at a rate of 20° C. per minute and then maintained at 400° C. for one hour during which time essentially all (about 5 mg) of the physically absorbed water was removed from the sample. The temperature was then increased to 700° C. at a rate of 20° C. per minute and held at 700° C. for approximately one hour. During this time more water was lost, corresponding to 0.245 mg, or 0.37% by weight of the sample. When corrected for buoyancy and gas stream and density effects, the high temperature loss was about 0.35 mg (about 0.50% wt).

Altogether, 94% of the water desorbed from the sample was desorbed at 400° C. by the physical desorption process, and 6% of the desorbed water was desorbed at 700° C. by the chemical process of dehydroxylation. The TGA curve for this experiment is presented in FIG. 1.

The sample was then cooled to 200° C. at a rate of 20° C. per minute, and held at 200° C. for 30 minutes. Upon cooling to 200° C., the sample resorbed water from the surroundings by the mechanism of rehydroxylation. The sample was then cooled to 25° C. at a rate of 20° C. per minute. Upon cooling to ambient temperature, the sample resorbed additional water by physical readsorption. The entire experiment was repeated, with the same results. The fact that the experiment was reproducible with the same sample is a proof that the zeolite remained intact, or almost intact.

When superheated to above 900° C., the zeolite was destroyed and no water readsorption, by either rehydroxylation or physical adsorption, occurred. A subsequent TGA experiment with the sample gave a flat curve with no weight loss.

Example 1(B)

A TGA scan of a 64.7 mg sample of the Tosoh zeolite was run as follows. The sample was held for 1 minute at 25° C. The sample was then heated from 25° C. to 1200° C. at a rate of 40° C. per minute. The TGA curve is shown in FIG. 2. The TGA scan shows a main $H_2O$ desorption (weight loss) peak centered at 140° C., and a second peak centered at about 890° C.

Example 1(C)

A TGA scan of a 68.7 mg sample of a United Catalysts (UC) mordenite zeolite T-2581 heterogeneous catalyst (25–35% aluminum oxide; 65–75% mordenite; <5% nickel oxide; 30–40 lbs/cu. ft. bulk density) was run as follows. The sample was held for 1 minute at 35° C. The temperature was then increased to 800° C. at a rate of 20° C. per minute, and held at 800° C. for one hour. The sample was then cooled to 200° C. at a rate of 20° C. per minute, held at 200° C. for 30 minutes, and then cooled to 50° C. at a rate of 20° C. per minute. The TGA curve for this experiment is presented in FIG. 3. The TGA scan shows a main low-temperature water peak and two high-temperature peaks at about 580° C. and about 800° C.

Example 1(D)

A TGA scan of a 66.6 mg sample of the Tosoh zeolite was run as follows. The sample was held at 35° C. for one minute. The temperature was then increased to 800° C. at a rate of 20° C. per minute, and held at 800° C. for one hour. The sample was then cooled to 200° C. at a rate of 20° C.

per minute, held at 200° C. for 30 minutes, and then cooled to 50° C. at a rate of 20° C. per minute. The TGA curve for this experiment is presented in FIG. 4. The TGA scan shows that the sample loses water in an amount of about 3.5% by weight of the sample at low temperature (peak at 130° C.), and water in an amount of about 0.3% by weight of the sample at about 800° C.

Example 1(E)

A TGA scan of a 66.6 mg sample of the Tosoh zeolite was run as follows. The sample was held at 35° C. for one minute. The temperature was then increased to 400° C. at a rate of 20° C. per minute, and held at 400° C. for one hour. The temperature was then increased to 800° C. at a rate of 20° C. per minute. The sample was then cooled to 200° C. at a rate of 20° C. per minute and held at 200° C. for 30 minutes, followed by cooling to 25° C. at a rate of 20° C. per minute. The TGA curve for this experiment is presented in FIG. 5. The TGA scan shows low and high temperature water peaks.

Example 1(F)

A TGA scan of a 119.3 mg sample of a United Catalysts (UC) mordenite zeolite T-2581 (as in Example 1(C)) was run as follows. The sample was held at 35° C. for one minute. The temperature was then increased to 400° C. at a rate of 20° C. per minute, and held at 400° C. for one hour. The temperature was then further increased to 700° C. at a rate of 20° C. per minute, and held at 700° C. for one hour. The sample was then cooled to 200° C. at a rate of 20° C. per minute, held at 200° C. for 30 minutes, and then further cooled to 25° C. at a rate of 20° C. per minute. The TGA curve for this example is presented in FIG. 6. The TGA scan shows that there is more water loss at high temperature, i.e. about 1.3% of dehydrated sample.

Example 1(G)

A TGA scan of a 245.4 mg sample of United Catalysts (UC) mordenite zeolite T-2581 (as in Example 1(C)) was run as follows. The sample was held at 35° C. for one minute. The temperature was then increased to 350° C. at a rate of 20° C. per minute, and held at 350° C. for one hour. The temperature was then further increased to 700° C. at a rate of 20° C. per minute, and held at 700° C. for one hour. The sample was cooled to 200° C. at a rate of 20° C. per minute, and held at 200° C. for 30 minutes, followed by further cooling to 25° C. at a rate of 20° C. per minute. The TGA curve for this experiment is presented in FIG. 7.

Example 1(H)

A repeat TGA scan of the 245.4 mg sample of United Catalysts (UC) mordenite zeolite of Example 1(G) was run after rehydration of the sample at ambient conditions (about 5% humidity). The TGA scan was run as described in Example 1(G). The TGA curve for this experiment is presented in FIG. 8. The TGA scan shows that the high temperature water desorbed is significantly less.

Example 1(I)

A TGA scan of a 392.2 mg sample of the Tosoh zeolite was run as follows. The sample was held at 35° C. for one minute. The temperature was then increased to 400° C. at a rate of 20° C. per minute, and held at 400° C. for 240 minutes. The temperature was then further increased to 700° C. at a rate of 20° C. per minute, and held at 700° C. for one hour. The sample was then cooled to 200° C. at a rate of 20° C. per minute, held at 200° C. for 30 minutes, and then further cooled to 25° C. at a rate of 20° C. per minute. The TGA scan for this experiment is presented in FIG. 9.

Example 1(J)

A TGA scan of a 69.0 mg sample of PQ Corporation mordenite zeolite (Zeolyst International Product No. CBV 20A, silica-to-alumina ratio: 20; nominal cation form: ammonium;

0.08% (wt) $Na_2O$; 500 $m^2/g$ surface area) was run as follows. The sample was held at 35° C. for one minute. The temperature was then increased to 400° C. at a rate of 20° C. per minute, and held at 400° C. for one hour. The temperature was then further increased to 700° C. at a rate of 20° C. per minute, and held at 700° C. for one hour. The sample was then cooled to 200° C. at a rate of 20° C. per minute, held at 200° C. for 30 minutes, and then further cooled to 50° C. at a rate of 20° C. per minute.

The TGA curve for this experiment is presented in FIG. 10. The TGA scan shows that about 15% of weight loss occurs during the second temperature ramping. Using the same sample, the TGA scan was repeated using the same conditions. The repeat TGA scan for the sample is presented in FIG. 11, which shows that the weight loss at high temperature is about one-third of what it was before. The TGA scan was repeated three more times under the same conditions. The TGA curves for these repeated TGA scans are presented in FIGS. 12, 13 and 14 respectively, which show essentially the same results. These TGA scans demonstrate that reproducibility of water removal from calcined-rehydrated mordenite is excellent. About one-half percent weight loss occurs above 400° C. (about 5% of entire weight loss).

Example 1(K)

A TGA scan of a 46.1 mg sample of PQ Corporation Beta-Type zeolite (BEA) (Zeolyst International Product No. CP814-B, silica-to-alumina ratio: 20; nominal cation form: ammonium; 0.05% (wt) $Na_2O$; 680 $m^2/g$ surface area) was run using the same temperature program described in Example 1(J). The TGA curve for this experiment is presented in FIG. 15. The TGA scan shows 5.2 mg weight loss during the first ramping (11% by weight of the sample), and 0.3 mg weight loss during the second ramping (0.5% by weight of the sample).

Example 1(L)

A TGA scan of a sample of PQ Corporation Type Y zeolite (FAU) (Zeolyst International Product No. CBV712; silica-to-alumina mole ratio: 12; nominal cation form: ammonium; 0.05% (wt) $Na_2O$; 24.35 Å unit cell size; 730 $m^2/g$ surface area) was run using the temperature program described in Example 1(J). The TGA curve for this experiment is presented in FIG. 16. The TGA scan shows that about 0.5% of the weight loss occurs during the second ramping, and that the PQ Type Y zeolite has essentially similar behavior to mordenite.

Example 1(M)

A TGA scan of a 73.8 mg sample of PQ Corporation ZSM-5 Type zeolite (Zeolyst International Product No. CBV 3024; silica-to alumina mole ratio: 30; nominal cation form: ammonium; 0.05% (wt) $Na_2O$; 375 $m^2/g$ surface area) was run using the same temperature program described in Example 1(J). The TGA curve for this experiment is presented in FIG. 17. The TGA scan shows about 5.0 mg weight loss during the first ramping (about 6.5% by weight of the sample) and about 0.3 mg weight loss during the second ramping (0.4% by weight of the sample).

Example 2

Preparation of Superheated Zeolite by Activation of Tosoh Mordenite at the 1L Scale

Example 2(A)

637.3 grams (about 1.05 liter) of freshly sieved Tosoh mordenite (between 8 and 25 mesh) were charged into a quartz reactor tube (2 inch internal diameter).

The reactor was equipped with a quartz frit to maintain the solid pellets in the downstream direction. A hole in the middle of the frit allowed the introduction of a thermocouple into the reactor (upstream), such that the tip of the thermocouple was placed at about the middle of the zeolite bed. On the other end of the reactor, a Pyrex glass container was attached to the reactor mouth through a wide-mouth glass joint. Prior to and during the activation (heating) run, the container was constantly heated by an external heating tape to about 130° C., to eliminate moisture from the glass. During the activation run, the reactor-container was purged continuously with dry cylinder or house nitrogen which had been passed through a Nanochem® purifier to further reduce the moisture level from about 1 ppm to about 100 ppt or less. The nitrogen purge gas was flowed into the system through a side arm, equipped with a valve, attached to the upstream part of the reactor near the reactor wide mouth. At the downstream end, a side tubing allowed the nitrogen gas to pass either through a second Nanochem® purifier (to prevent moisture from reentering the reactor during the cooling stage) or through a bypass line, then through a rotameter (1–5 liter per minute range) to vent. The purge flow was kept at 1–2, usually about 1.5 liter per minute. Initially, during heating, the nitrogen was flowed to vent through the bypass line. The reactor was placed inside a tubular horizontal Lindberg high-temperature (0–1200° C.) furnace.

Heating of the reactor was started by setting the temperature control to gain a bed temperature over 200° C.; sufficient time was allowed to have the inside temperature and the outside temperature (measured by a second thermocouple placed between the reactor tube and the furnace ceramic material) to become practically the same, or very close. When the outside temperature was 249° C. and the inside temperature was 223° C., water was observed to condense on the reactor cold outlet. A heat-gun was used to eliminate the droplets formed by evaporating them into the gas stream. The temperature was then increased to 280° C. (inside and outside) and more condensing water was observed; however, these droplets in the reactor outlet section eventually disappeared. The flow was then 1.0 liter per minute. Heating was continued to a temperature of 400° C., then to 445° C. (inside). At this stage the flow of nitrogen was increased to 2 liter per minute to assist fast removal of moisture generated in the reactor outlet because of the extensive dehydration of the zeolite. Subsequently, over a period of about two hours, the temperature was raised to about 740° C. After about 30 minutes at 740° C., heating was stopped. The flow of nitrogen was diverted from the bypass to the second Nanochem® purifier (by closing the free line and opening the valve to the purifier), and continued overnight while the system slowly cooled back to room temperature. The glass container continued to be heated.

After cooling overnight, the heating tape was removed from the container and the reactor-container unit was disengaged from the gas lines while still held closed to the outside atmosphere, and the purifiers were shut off. Taken carefully out from the furnace, the reactor-container was tilted to a vertical position to transfer the zeolite into the container. The reactor-container was then transferred into a closed plastic sleeve purged with Nanochem®-purified nitrogen. A stopcock fitting the container wide mouth, which had been left in the oven at 110° C. for 24 hours, was added to the plastic sleeve. The dry nitrogen purge of the plastic sleeve was made sufficient to slightly inflate the sleeve. After 2½ hours in the plastic sleeve, the container was detached from the reactor (inside the sleeve) and closed instantly with the stopcock. The nitrogen purge was stopped and the container (now separated from the reactor) was transferred to a glovebox under Nanochem® pure nitrogen atmosphere. In the glovebox, the content of the Pyrex container was transferred to a 1,000 ml polypropylene jar which had been kept previously at least overnight inside the glove box, to remove moisture from the plastic material. The Pyrex container was then returned to the reactor setup for the next batch of product.

Example 2(B)

The preparation of Example 2 was repeated, except that 620 grams of the Tosoh zeolite were processed this time, and superheating was carried out at 700° C. for 105 minutes.

Example 2(C)

Another 1 liter batch of the purifier was made, but with 650 grams (~1.1 liter) taken from another drum of the raw material, freshly opened, which did not require sieving since it contained no visually detectable dust/powder. The activation of the zeolite under superheating conditions was performed at 705° C. for 120 minutes.

Example 2(D)

This is a reference experiment of making a purifier by thermal activation but without superheating. Except for the superheating, this experiment followed closely the procedure of Example 2(A). 635 grams of the Tosoh zeolite from the same drum as used in Example 3, were charged into the reactor. Heating was performed to 415° C. for a period of 7 hours.

Example 3

Measurement of Moisture Capacity of Superheated Zeolite Using FT-IR

The moisture capacity of a sample of the super-heated zeolite, which had been prepared as described in Example 2(A) above, was measured using a Fourier Transform Infra Red (FT-IR) spectroscopy method described by D. E. Pivonka, 1991, *Applied Spectroscopy*, Vol. 45, Number 4, pp. 597–603.

The instrument used was a Nicolet Magna 760 FT-IR spectrometer equipped with an MCT (mercury cadmium tellurium alloy) detector. As described by Pivonka, the spectrometer was equipped with a 10 cm stainless steel cell in the auxiliary sample compartment for measurement of the water concentration at the inlet of the purifier, and a 10 m nickel-plated stainless steel cell for measurement of the water concentration downstream of the purifier. The water concentration of the inlet gas stream to the purifier, which is referred to herein as the "moisture challenge," was in the hundreds to thousands ppm range. The water concentration of the gas downstream of the purifier prior to breakthrough is typically in the range of 100 ppb–10 ppm. The spectrometer was enclosed in a plastic box dried under a constant Nanochem®-purified nitrogen purge of 20 liter per minute.

The "moisture challenge" gas stream having a constant concentration of about 400–500 ppm was generated as follows. Nitrogen was passed over a water diffusion vial held in a stainless steel autoclave at a constant temperature of 80° C., generating a moisture-containing nitrogen gas stream. The moisture-containing nitrogen gas stream was diluted with a stream of dry matrix gas (i.e., $N_2$, HCl, or HBr), resulting in the "moisture challenge" gas stream. The accurate concentration of water in the moisture challenge gas stream was calculated based on the gas flow (through a calibrated mass-flow controller) and measuring the amount of water in the diffusion vial before and after the experiment. The purifier unit consisted of an L-60 container having 60 ml of purifier material in a tubular 20 cm height bed. The "moisture challenge" gas stream was introduced into the purifier unit at a flow rate of 2000 cc(STP)/min, under pressure of 13.4 psia. The temperature of both the 10 cm and 10 m FT-IR cells was maintained at 110° C., and the MCT detector was held at –190° C.

The FTIR measurement was based on the change in the water absorbance line at 3853 $cm^-$. Continuous automatic and programmed operation of the FTIR was done by employing an OMNIC™ software. The run was continued until a breakthrough occurred, meaning a sudden and drastic increase in water level downstream of the purifier. The breakthrough point was defined and calculated as the cross-section of the baseline representing moisture removal to the full efficiency of the purifier (usually, below the FTIR detection limit, i.e., about 100 ppb) and the tangent of the breakthrough line showing a gradual increase in water level (as higher intensity absorbance). The transformation of the collected data and the breakthrough point into capacity terms as liter moisture (gas phase) per liter purifier, was done by straightforward arithmetic calculations. Results of the FTIR capacity test for the superheated mordenite purifier, with HCl, HBr and $N_2$ matrix gases, are listed in Table 1.

The capacity under nitrogen is the lowest, but still very high and about 50% higher than the capacity of a chlorosilylated alumina as measured under identical conditions (11 L/L). Under HBr, a 'record' capacity has been measured which is 35% higher than the capacity under nitrogen. It could be that the acid gas 'conditions' the zeolite thereby creating more sites for water removal, perhaps by chemisorption or a chemical reaction. One possibility is the generation of chloro- and bromosilyl or aluminyl groups on the zeolite surface by a partial reaction of the zeolite with HCl and HBr, respectively, ≡Si—O—T≡+HX→≡Si—OH+≡T—X

≡T—X+$H_2$O→≡T—OH+HX

T being a tetrahedral framework element (either Si or Al) and X being halide element (Cl, Br).

Example 4

Measurement of Moisture Capacity of Superheated Zeolite Using Ametek 2850 Moisture Analyzer In this Example, we describe moisture capacity measurement of purifiers using an Ametek 2850 moisture analyzer. This analyzer allows the measurement of moisture in the range of 0.1–1000 ppm, under a gas pressure in the range of 15–75 psig. The purifier unit was challenged with 400–450 ppm moisture in nitrogen, generated as described in Example 3 by diluting a nitrogen stream passed through an autoclave containing a diffusion vial (to provide a moisture level of 8000–9000 ppm) with a dry nitrogen stream, at a ratio of 1-to-19, respectively. The combined gas stream was flowed through the purifier at a rate of 2000 cc(STP)/min, at a pressure of 29.7 psia. A 'breakthrough' behavior was obtained as in the FTIR measurement described in Example 3, but the breakthrough point in the present example was defined and calculated as the point of 1 ppm moisture on the breakthrough curve. This point was very close to the breakthrough point as defined in the FTIR measurement described in Example 3 (within 5% or so). The moisture analysis was done using a computer program transferable to Microsoft Excel®. The transformation of the collected data and the breakthrough point into capacity terms, as liter moisture (gas phase) per liter purifier, was done by straightforward arithmetic calculations. The results are shown in Table 1.

According to Table 1, the Ametek results are substantially higher than the FTIR results and this could be attributed to the pressure difference. A single experiment at 74.7 psia seemed to confirm that the effect of pressure on the adsorption of water onto the purifier is considerable. This effect is demonstrated in FIG. 18. Thus, using high pressure matrix gas may increase the purifier capacity for water dramatically. Comparing the different batches of the superheated mordenite purifier under the same pressure (29.7 psia) shows consistent capacity data of about 30 L/L. In contrast, a purifier made by activation at 415° C. exhibits a much lower capacity. The effect of the superheating, according to the Ametek capacity measurement, is a capacity increase of about 30%.

Example 5

Calculation of Moisture Capacity of Superheated Tosoh Mordenite Using Results of Thermogravimetric Analysis (TGA)

Here we calculate the effect of the superheating of Tosoh mordenite on the moisture capacity as measured with nitrogen matrix gas, based on the TGA results. As shown, there is excellent agreement between the prediction made based on the TGA work and the actual effect as obtained with the 1 L batch samples.

As listed in Table 1, one sample of the superheated zeolite had a capacity of 17 L/L (under atmospheric pressure). A typical TGA experiment, as described in Example 1(A), and depicted in FIG. 1, gives the following results: At 400° C., there is 5.9% water loss; between 400 and 700° C., there is additional loss of 0.38% which after correction for buoyancy and flow effects (by subtracting the blank curve of empty TGA pan) becomes 0.50%. The original weight of the partly hydrated mordenite zeolite was 65.90 mg. Therefore, 3.89 mg moisture was lost up to 400° C., and additional 0.33 mg up to 700° C.; the superheated sample weighed 61.68 mg.

As shown in Table 1, the capacity of one sample of the superheated zeolite was 17 liters of water vapor per liter of superheated zeolite. 17 L of water vapor corresponds to 13.66 grams of water; and one liter of superheated zeolite weighs 600 grams. Thus, 600 grams of the superheated zeolite (1L) has the capacity to absorb 13.66 grams of water. Therefore, the capacity value corresponds to (13.66/600)× 100=2.277% by weight. This is the resorbed water by both chemical ('rehydroxylation') and physical adsorption. Thus, the total resorbed water up to the capacity breakthrough point, in the case of the above sample, is (61.68×2.277)/100=1.404 mg. Since the 'dehydroxylation' water amount is 0.33 mg and it is reasonable to assume that all of that water will resorb, the 'leftover' water for physical adsorption is 1.404−0.33=1.074 mg (27.6% of the desorbed water up to 400° C.).

We can now calculate the capacity of the zeolite activated at 400° C., based on the TGA. 1.074 mg water physically resorbed over (61.68+0.33)=62.01 mg dry zeolite activated at 400° C. Since 1.074 mg water is 1.3365 ml of standard gas phase $H_2O$, and since 62.01 mg zeolite purifier activated at about 400° C. is 0.10335 ml volume, the capacity is 1.3365/0.10335=12.9 L/L. The increased capacity due to 'dehydroxylation' is (17−12.9)/12.9=0.315 (or 31.5%), in perfect accord with the above large-scale direct results.

TABLE 1

Moisture Capacity of Superheated Zeolites

| Activation Temperature (° C.)/Time (min) | Matrix Gas | Pressure (psia) | Analyzer | Moisture Capacity (L/L) |
|---|---|---|---|---|
| 740/30 (Example 2A) | HCl | 13.4 | FTIR | 20 |
| | HBr | 13.4 | FTIR | 23 |
| | $N_2$ | 13.4 | FTIR | 17 |
| | $N_2$ | 29.7 | Ametek | 27 |
| 700/105 (Example 2B) | $N_2$ | 29.7 | Ametek | 31 |
| 705/120 (Example 2C) | $N_2$ | 29.7 | Ametek | 29 |
| | $N_2$ | 74.7 | Ametek | 52 |
| 415/420 (Example 2D) | $N_2$ | 29.7 | Ametek | 23 |

The present invention is not to be limited in scope by the specific embodiments and examples described herein. Indeed, various modifications of the invention in addition to those described herein will become apparent to those skilled in the art from the foregoing description and accompanying figures. Such modifications are intended to fall within the scope of the appended claims.

Various publications are cited herein, the disclosures of which are hereby incorporated by reference in their entireties.

What is claimed is:

1. A method for removing water from a gas, comprising contacting said gas with a zeolite which has a silica-to-alumina ratio of above about 10, wherein the zeolite has been heated prior to contacting it with said gas to a temperature above about 650° C.

2. The method of claim 1, wherein said temperature above about 650° C. is sufficient to cause dehydroxylation of the zeolite.

3. The method of claim 1 wherein the silica-to-alumina ratio of the zeolite is in the range of about 10 to about 30.

4. The method of claim 1 wherein the silica-to-alumina ratio of the zeolite is in the range of about 15 to about 20.

5. The method of claim 1 wherein the zeolite has a uniform particle size of about 1–1.5 mm.

6. The method of claim 1 wherein the zeolite is a mordenite zeolite.

7. The method of claim 1 wherein the zeolite is in the acidic form.

8. The method of claim 1 wherein the zeolite comprises less than about 1% by weight sodium as sodium oxide ($Na_2O$).

9. The method of claim 1 wherein the gas is hydrogen chloride.

10. The method of claim 1 wherein the gas is hydrogen bromide.

11. The method of claim 1 wherein the zeolite comprises less than about 20 ppm titanium.

12. The method of claim 1 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

13. The method of claim 1 wherein the zeolite is heated to a temperature of about 700° C. prior to contacting it with the gas.

14. A method for removing water from a gas, comprising:
(a) heating a zeolite to about 400° C. for a first period of time sufficient to desorb physically adsorbed water from the zeolite, wherein the zeolite has a silica-to-alumina ratio of above about 10;
(b) heating the zeolite to a temperature above about 650° C. for a second period of time, thereby forming a superheated zeolite;
(c) contacting the superheated zeolite with the gas; and
(d) allowing the superheated zeolite to adsorb the water from the gas.

15. The method of claim 14 wherein said heating to a temperature above about 650° C. for said second period of time is sufficient to cause dehydroxylation of the zeolite.

16. The method of claim 14 wherein the silica-to-alumina ratio of the zeolite is in the range of about 10 to about 30.

17. The method of claim 14 wherein the silica-to-alumina ratio of the zeolite is in the range of about 15 to about 20.

18. The method of claim 14 wherein the zeolite has a uniform particle size of about 1–1.5 mm.

19. The method of claim 14 wherein the zeolite is a mordenite zeolite.

20. The method of claim 14 wherein the zeolite is in the acidic form.

21. The method of claim 14 wherein the zeolite comprises less than about 1% by weight sodium as sodium oxide ($Na_2O$).

22. The method of claim 14 wherein the gas is hydrogen chloride.

23. The method of claim 14 wherein the gas is hydrogen bromide.

24. The method of claim 14 wherein the zeolite comprises less than about 20 ppm titanium.

25. The method of claim 14 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

26. The method of claim 14 wherein the zeolite is heated to a temperature of about 700° C. prior to contacting it with the gas.

27. A method for preparing a dehydroxylated zeolite, comprising:
(a) heating the zeolite at about 400° C. for a first period of time sufficient to desorb a first amount of water that is physically adsorbed on the zeolite from the zeolite; and
(b) heating the zeolite to a temperature above about 650° C. for a second period of time sufficient to remove a second amount of water from the zeolite by dehydroxylation of the zeolite.

28. The method of claim 27 wherein the silica-to-alumina ratio of the zeolite is in the range of about 10 to about 30.

29. The method of claim 27 wherein the silica-to-alumina ratio of the zeolite is in the range of about 15 to about 20.

30. The method of claim 27 wherein the zeolite has a uniform particle size of about 1–1.5 mm.

31. The method of claim 27 wherein the zeolite is a mordenite zeolite.

32. The method of claim 27 wherein the zeolite is in the acidic form.

33. The method of claim 27 wherein the zeolite comprises less than about 1% by weight sodium as sodium oxide ($Na_2O$).

34. The method of claim 27 wherein the zeolite comprises less than about 20 ppm titanium.

35. The method of claim 27 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

36. A dehydroxylated zeolite which has a silica-to-alumina ratio of above about 10 and a low level of metallic impurities, wherein the zeolite has been heated to a temperature above about 650° C. sufficient to cause dehydroxylation of the zeolite, and wherein the zeolite comprises less than about 20 ppm titanium, less than about 100 ppm iron, and less than about 11 ppm magnesium.

37. The zeolite of claim 36 wherein the silica-to-alumina ratio of the zeolite is in the range of about 10 to about 30.

38. The zeolite of claim 36 wherein the silica-to-alumina ratio of the zeolite is in the range of about 15 to about 20.

39. The zeolite of claim 36 wherein the zeolite has a uniform particle size of about 1–1.5 mm.

40. The zeolite of claim 36 wherein the zeolite is a mordenite zeolite.

41. The zeolite of claim 36 wherein the zeolite is in the acidic form.

42. The zeolite of claim 36 wherein the zeolite comprises less than about 1% by weight sodium as sodium oxide ($Na_2O$).

43. The zeolite of claim 36 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

44. The zeolite of claim 36 wherein the zeolite is heated to a temperature of about 700° C.

45. A dehydroxylated zeolite which has a silica-to-alumina ratio of above about 10, and a low level of metallic impurities, wherein the zeolite has been heated to about 400° C. for a first period of time sufficient to desorb physically adsorbed water from the zeolite, and wherein the zeolite has been heated to a temperature above about 650° C. for a second period of time sufficient to cause dehydroxylation of the zeolite.

46. The zeolite of claim 45 wherein the silica-to-alumina ratio of the zeolite is in the range of about 10 to about 30.

47. The zeolite of claim 45 wherein the silica-to-alumina ratio of the zeolite is in the range of about 15 to about 20.

48. The zeolite of claim 45 wherein the zeolite has a uniform particle size of about 1–1.5 mm.

49. The zeolite of claim 45 wherein the zeolite is a mordenite zeolite.

50. The zeolite of claim 45 wherein the zeolite is in the acidic form.

51. The method of claim 45 wherein the zeolite comprises less than about 1% by weight sodium as sodium oxide ($Na_2O$).

52. The zeolite of claim 45 wherein the zeolite comprises less than about 20 ppm titanium, less than about 100 ppm iron, and less than about 11 ppm magnesium.

53. The zeolite of claim 45 wherein the zeolite is selected from the group consisting of ZSM-5 (MFI), ZSM-11 (MEL), beta (BEA), faujasite USY (FAU), hexagonal faujasite (EMT), ferrierite (FER) and chabazite (CHA).

54. The zeolite of claim 45 wherein the zeolite is heated to a temperature of about 700° C. prior to contacting it with the gas.

* * * * *